(12) United States Patent
Tanase et al.

(10) Patent No.: US 6,324,137 B2
(45) Date of Patent: Nov. 27, 2001

(54) INFORMATION RECORDING AND REPRODUCTION APPARATUS CARRYING OUT RECORDING AND REPRODUCTION OF INFORMATION USING LASER BEAM

(75) Inventors: Kenji Tanase; Atsushi Yamaguchi; Kenji Nakao; Hisashi Matsuyama; Yoshihiro Hori; Satoshi Sumi, all of Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/828,935

(22) Filed: Apr. 10, 2001

Related U.S. Application Data

(62) Division of application No. 08/861,791, filed on May 22, 1997, now Pat. No. 6,240,056.

(30) Foreign Application Priority Data

May 24, 1996 (JP) .................................................. 8-129871
Jan. 31, 1997 (JP) .................................................. 9-019150

(51) Int. Cl.[7] .......................... G11B 7/005; G11B 7/125; G11B 7/135
(52) U.S. Cl. ................. 369/47.28; 369/47.5; 369/53.34; 369/112.02; 369/112.19
(58) Field of Search .................................. 369/13, 44.23, 369/44.26, 47.28, 47.35, 47.5, 53.22–53.23, 53.34, 59.2, 112.02, 112.19, 116

(56) References Cited

U.S. PATENT DOCUMENTS

| 4,507,763 | 3/1985 | Kato . |
| 5,504,722 | 4/1996 | Tanaka et al. . |
| 5,761,172 | 6/1998 | Minemura et al. ..................... 369/59 |
| 5,771,220 | 6/1998 | Yuasa et al. ......................... 369/116 |

FOREIGN PATENT DOCUMENTS

| 63 271723 | 11/1988 | (JP) . |
| 5-303766 | 11/1993 | (JP) . |

OTHER PUBLICATIONS

Yutaka Yamanaka et al.; Japanese Journal of Applied Physics, vol. 28, Supplement 28–3, pp. 197–200, 1989.

M. Kaneko et al., Proceedings of Magneto–Optical Recording International Symposium '96, J. Magn. Soc. Jpn.; vol. 20; Supplement No. S1, pp. 7–12, 1996.

Patent Abstracts of Japan, vol. 012, No. 451 (P–791), Nov. 28, 1988 & JP 63 173252 A (Sony Corp), Jul. 16, 1988.

Patent Abstracts of Japan, vol. 017, No. 197 (P–1523), Apr. 16, 1993 and JP 04 344352 A (Mitsubishi Electric Corp), Nov. 30, 1992.

(List continued on next page.)

Primary Examiner—W. R. Young
(74) Attorney, Agent, or Firm—Armstrong, Westerman, Hattori, McLeland & Naughton, LLP

(57) ABSTRACT

An information recording and reproduction apparatus for a magneto-optical medium includes a synchronizing signal generation circuit for generating a synchronizing signal to provide a pulsed laser beam at the time of reproduction according to an internal clock obtained from a reproduction signal. The laser beam is driven on/off according to the synchronizing signal at the time of reproduction to have the laser spot on the signal plane prevented from being enlarged, so that the reproducible domain is smaller than the domain of when a laser beam is continuously emitted. In reproduction, an optical superresolution method is applied simultaneous to provision of a pulsed laser beam to allow reproduction of higher density. An external synchronizing signal generation circuit for generating an external synchronizing signal according to a wobble on a surface of a recording medium can be used instead of a synchronizing signal generation circuit according to an internal clock.

8 Claims, 37 Drawing Sheets

OTHER PUBLICATIONS

Patent Abstract of Japan, vol. 017, No. 250 (P–1537), May 18, 1993 and JP 04 368647 A (Sanyo Electric Co Ltd), Dec. 21, 1992.

Patent Abstract of Japan, vol. 015, No. 107 (P–1179), Mar. 14, 1991 & JP 03 001334A (Pioneer Electron Corp), Jan. 8, 1991.

Patent Abstract of Japan, vol. 014, No. 321 (P–1074), Jul. 10, 1990 & JP 02 105343 A (Canon Inc), Apr. 17, 1990.

Patent Abstract of Japan, vol. 096, No. 5, May 13, 1996 & JP 08 007285 A (Sanyo Electric Co Ltd), Jan. 12, 1996.

Patent Abstract of Japan, vol. 014, No. 494(P–1123), Oct. 26, 1990 & JP 02 201736A (Nippon Telegr & Telph Corp), Aug. 9, 1990.

Patent Abstract of Japan, vol. 013, No. 89 (P–836), Mar. 2, 1989 & JP 63 271723A (Canon Corp), Nov. 9, 1988.

Patent Abstract of Japan, vol. 303, (P–896), Jul. 12, 1989 & JP 01 078440 A (Victor Co of Japan Ltd), Mar. 23, 1989.

Patent Abstract of Japan, vol. 012, No. 245 (P–729), Jul. 12 1988 & JP 63 037843 A (Ony Corp), Feb. 18, 1988.

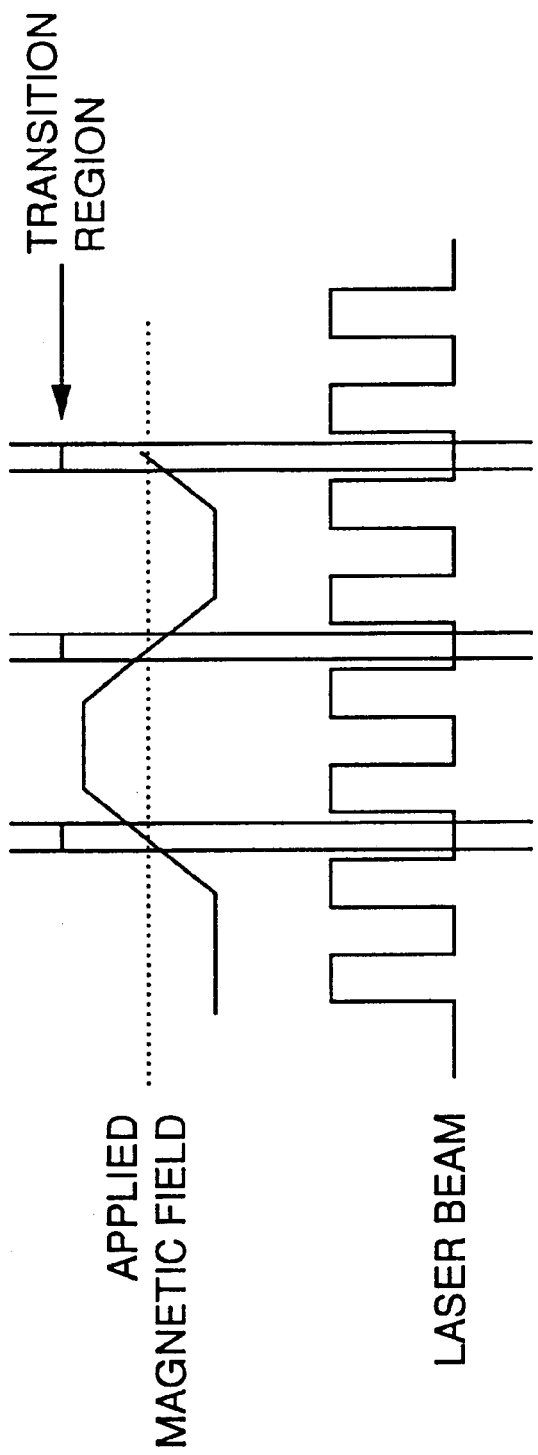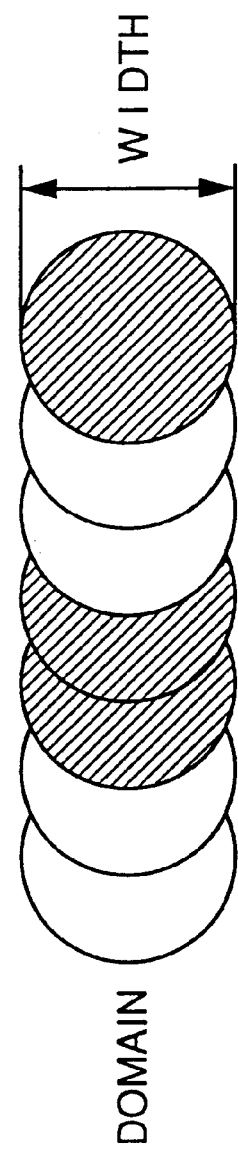
Fig.6A  
Fig.6B  
Fig.6C
TRANSITION REGION
APPLIED MAGNETIC FIELD
LASER BEAM
WIDTH
DOMAIN

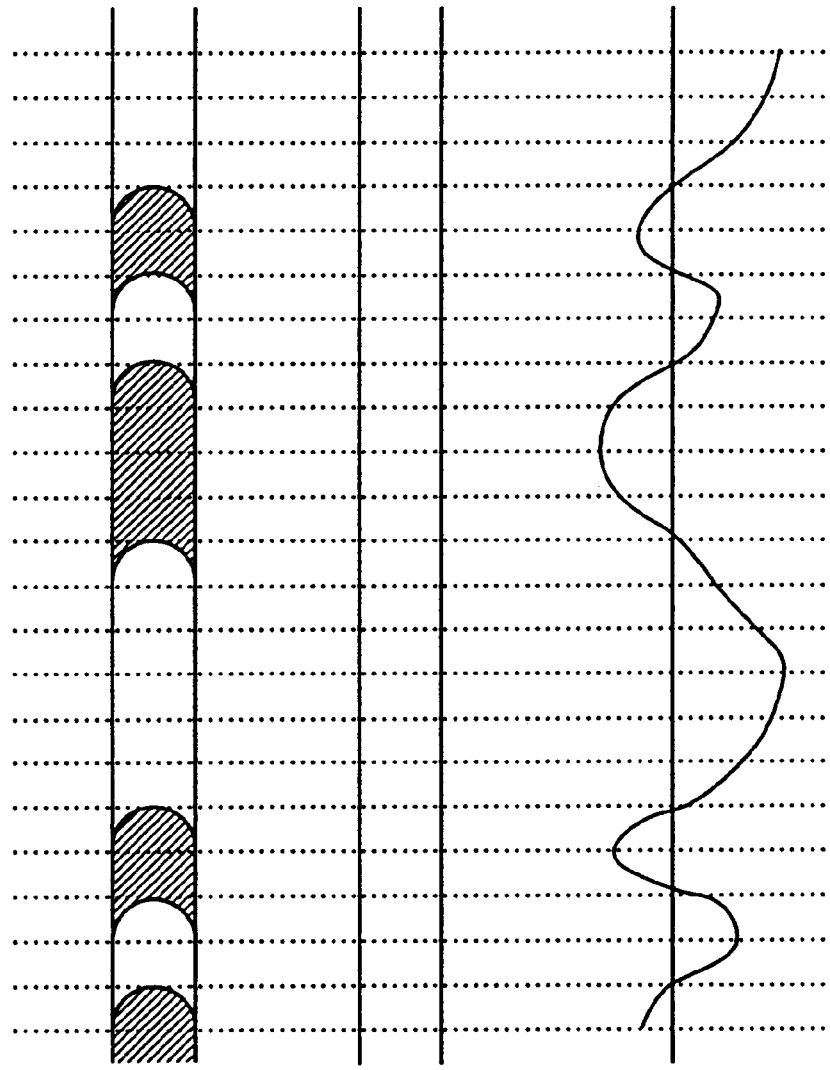

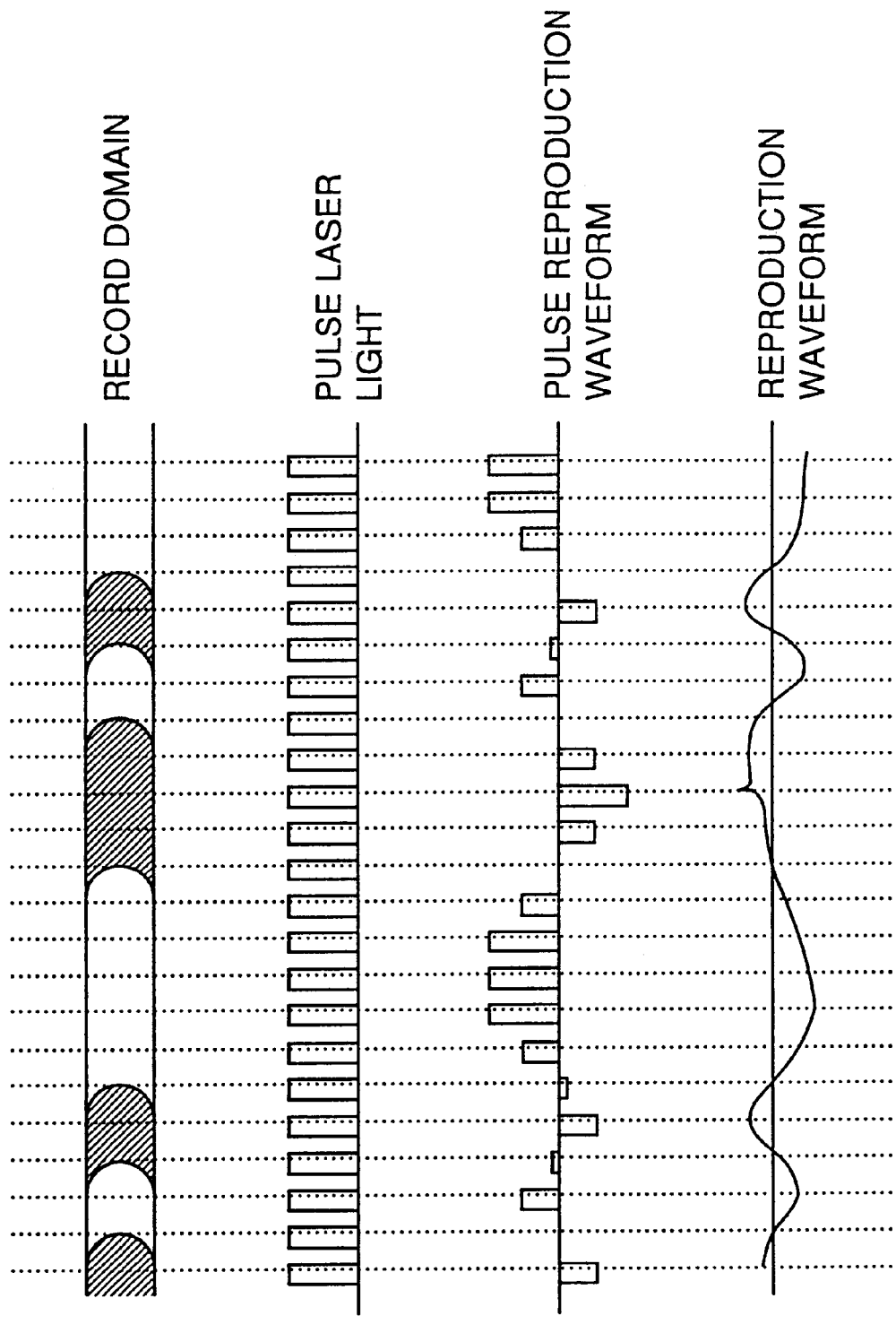

RECORD DOMAIN — WIDTH

PULSE REPRODUCTION LASER BEAM

REPRODUCTION WAVEFORM GENERAL DISK

REPRODUCTION WAVEFORM SUPERRSOLUTION DISK

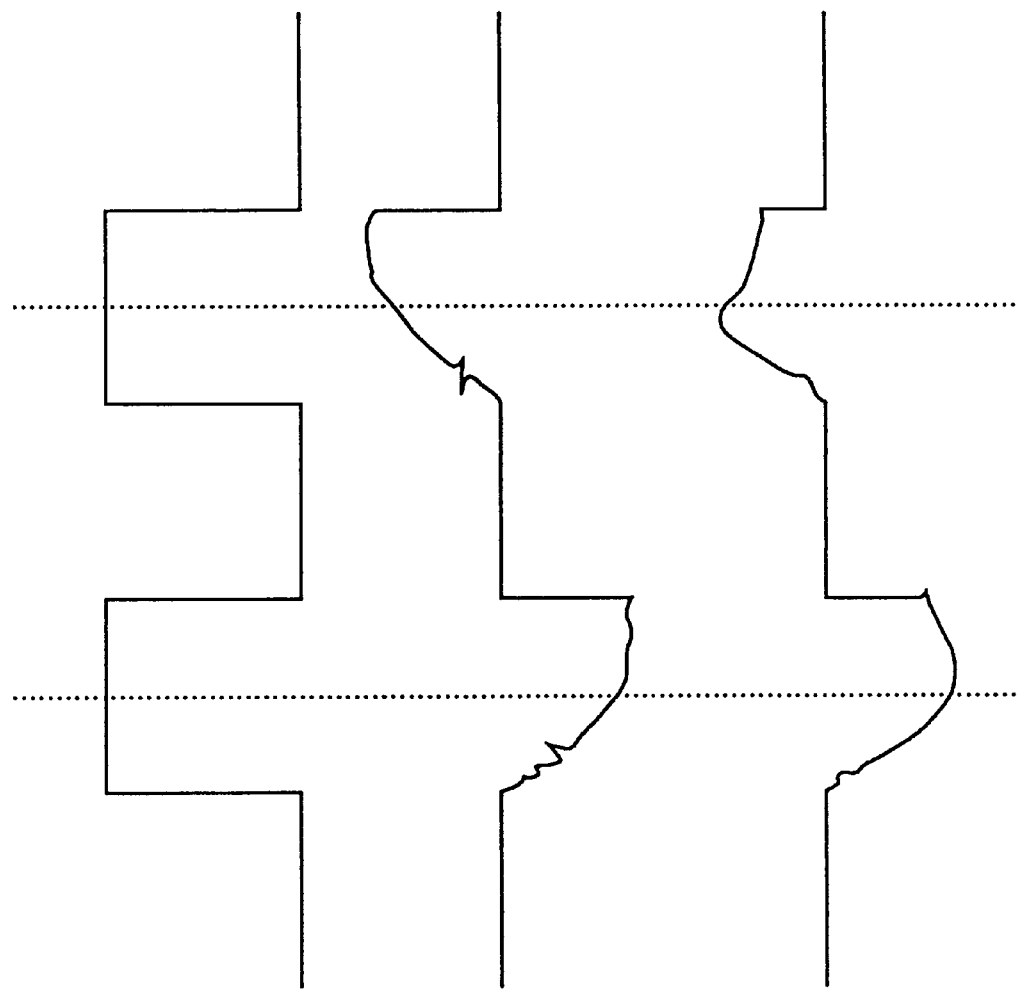

VOLTAGE APPLIED TO OUTER PORTION
121a, INNER PORTION 121b : OFF

VOLTAGE APPLIED TO INNER PORTION 121b : OFF
VOLTAGE APPLIED TO OUTER PORTION 121a : ON

VOLTAGE APPLIED TO OUTER PORTION
121a, INNER PORTION 121b : ON

VOLTAGE APPLIED TO INNER PORTION 121b : ON
VOLTAGE APPLIED TO OUTER PORTION 121a : OFF

VOLTAGE APPLIED TO OUTER PORTION 121a : ON

VOLTAGE APPLIED TO OUTER PORTION 121a : OFF

——— SILVER ATOM DEPOSITION REGION

·········· SILVER COMPOUND ORIENTATION REGION

INDICATE POLARIZATION CHARACTERISTIC

VOLTAGE APPLIED TO TRANSPARENT ELECTRODE 121 : OFF

VOLTAGE APPLIED TO TRANSPARENT ELECTRODE 121 : ON

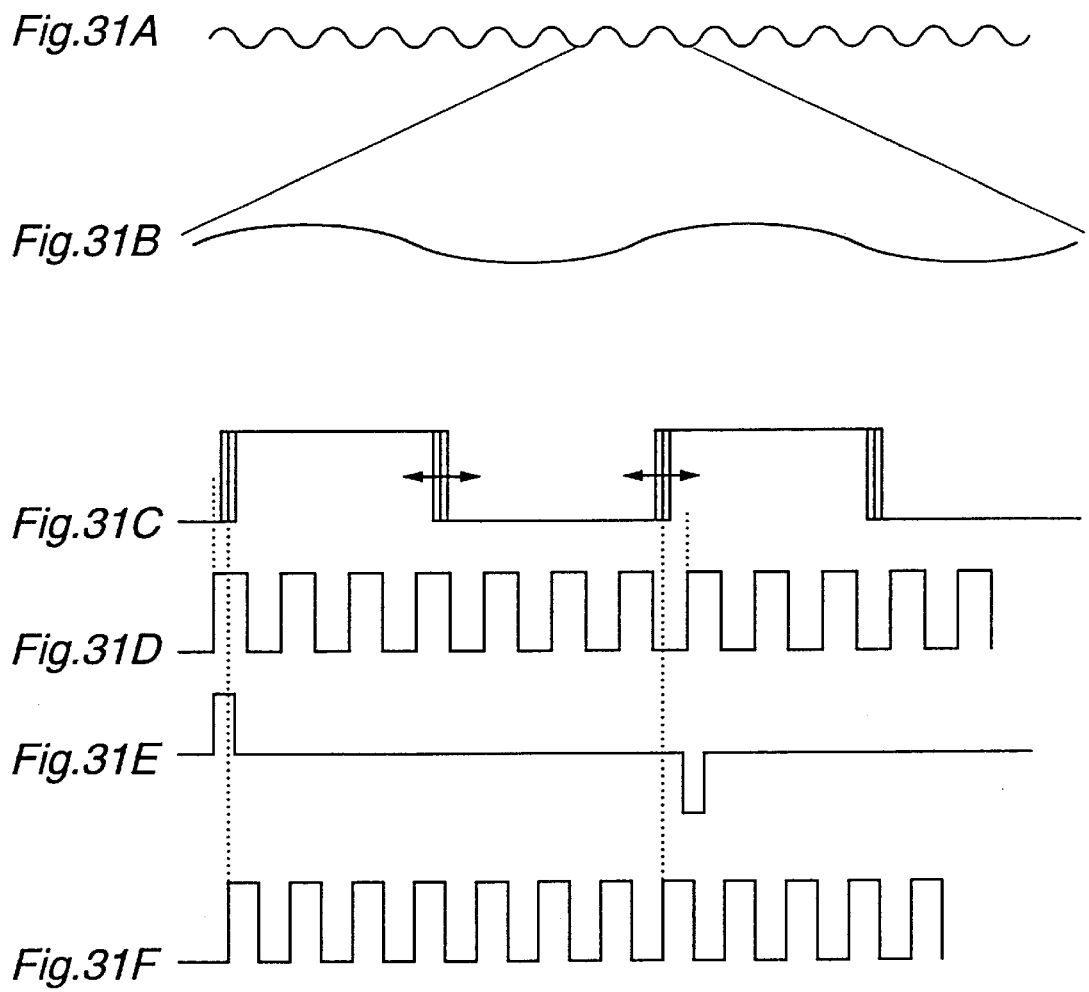

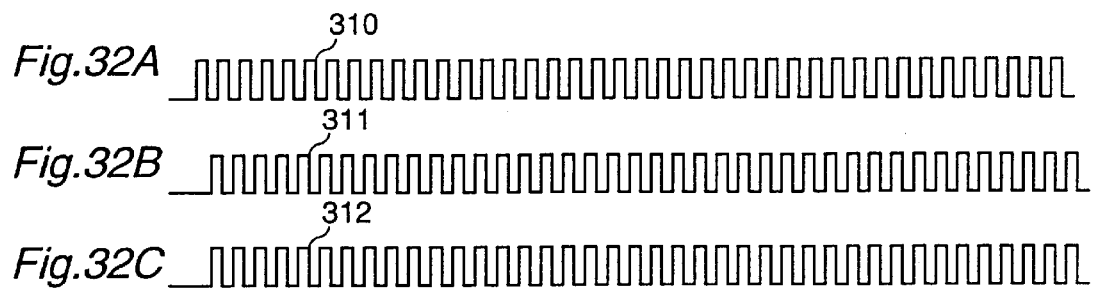
Fig.32A  310
Fig.32B  311
Fig.32C  312
Fig.33A  310
Fig.33B  313
Fig.33C  312

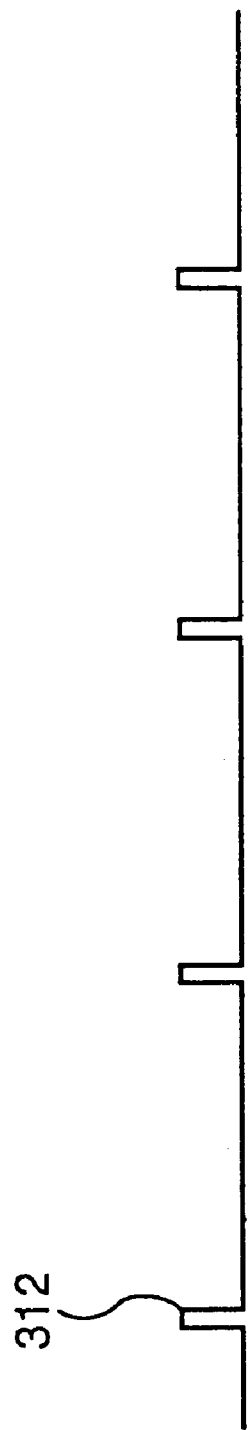

INFORMATION RECORDING AND REPRODUCTION APPARATUS CARRYING OUT RECORDING AND REPRODUCTION OF INFORMATION USING LASER BEAM

This application is a division of prior application Ser. No. 08/861,791 filed May 22, 1997, now U.S. Pat. No. 6,240,056.

BACKGROUND OF THE INVENTION

1. Field of the Invention

The present invention relates to information recording and reproduction apparatuses for recording and reproducing information using a laser beam. More particularly, the present invention relates to an information recording and reproduction apparatus that can reproduce at high density information from an information recording medium such as a magneto-optical recording medium and a phase transition recording medium by emitting a pulsed laser beam in reproduction.

2. Description of the Background Art

A magneto-optical recording medium is noteworthy of its rewritable ability, large storage capacity, and high reliability. It is already available for practical usage as the memory and the like for computers. However, the recording and reproducing technique of information at higher density is required in accordance with increase in the amount of information to be recorded and reduction in the size of the recording and reproduction apparatus.

The technique for recording and reproducing information at higher density is divided into the technique at the recording and reproduction apparatus end and the technique of the recording medium end.

The former includes, in addition to the method of rendering the wavelength of a laser beam shorter, the so-called optical superresolution method. This method achieves a focused spot that exceeds the diffraction limit of a laser beam by inserting a light blocking object in the light path of the laser beam. This optical superresolution method is disclosed in "High Density Optical Recording by Superresolution", Japanese Journal of Applied Physics, Vol. 28, Supplement 28-3, pp. 197–200, 1989 by Y. Yamanaka et al., for example.

The latter technique includes, in addition to the method of narrowing the pitch of the recording track of the medium, the method of improving the reproducing resolution using a magnetic multilayer film. This art of improving reproduction resolution using a magnetic multilayer film includes the step of providing a magneto-optical recording medium with a magnetic multilayer film having a recording layer and a reproduction layer. By taking advantage that the temperature distribution within the laser spot exhibits a Gaussian distribution that takes the maximum value around the center thereof, the magnetized state of the recording layer is selectively transferred to the reproduction layer by virtue of the exchange-couple force when being irradiated with a laser beam for reproduction. The magnetized state of that reproduction layer is read out at high density with a laser beam of a light power that is lower than that of recording. This technique is disclosed in, for example, "Recent Progress in Magnetically Induced Superresolution", Proceedings of Magneto-Optical Recording International Symposium '96, Journal of Magnetics Society of Japan, Vol. 20, Supplement No. S1, pp. 7–12, 1996 by M. Kaneko et al.

Conventional reproduction of information from such a magneto-optical recording medium is effected by continuously emitting a laser beam on the recording surface of a medium. However, there was a problem that reproduction at high density cannot be implemented when the laser beam for reproduction is emitted continuously.

This problem will be specifically described hereinafter. By using the optical superresolution method, the diameter of the laser beam for reproduction can be reduced up to approximately 0.78 $\mu$m at the present stage. The shortest domain length that can be reproduced with this beam diameter is 0.4 $\mu$m beam which corresponds to approximately half the diameter. At the current stage, the shortest domain length that can be recorded has become as small as approximately 0.15 $\mu$m. There was a problem that, even if the optical superresolution method is used, information recorded at a domain smaller than 0.40 $\mu$m cannot be reproduced. The reproduction technique cannot follow the currently available high density recording.

This problem is due to the fact that the laser beam is continuously emitted at the time of reproduction. This continuous emission of a laser beam will result in a greater laser spot for reproduction on the signal surface due to the fact that heat diffusion is generated on the signal surface of the medium and that the laser spot on the signal surface is extended by the relative movement between the medium and the laser beam. As a result, information recorded in a small domain cannot be reproduced.

This continuous emission of a laser beam also induces the problem that the laser output is gradually reduced since the semiconductor laser which is the light source is constantly turned on during reproduction. The lifetime of the semiconductor laser is also shortened and power consumption is increased by this continuous usage.

SUMMARY OF THE INVENTION

In view of the foregoing, an object of the present invention is to provide an information recording and reproduction apparatus that can reproduce at high density information using a laser beam from an information recording medium on which information is recorded at high density.

Another object of the present invention is to provide an information recording and reproduction apparatus that does not have the output of a semiconductor laser which is a light source reduced.

A further object of the present invention is to provide an information recording and reproduction apparatus that allows a longer lifetime of a semiconductor laser which is a light source and that allows power consumption.

According to an aspect of the present invention, an information recording and reproduction apparatus for an information recording medium includes an optical head, an information reproduction circuit, a drive circuit, and a first synchronizing signal generation circuit. The optical head emits a laser beam on a plane of an information recording medium on which a signal is recorded and detects the laser beam reflected from the signal recording plane. The information reproduction circuit reproduces information from the laser beam detected by the optical head. The drive circuit drives the optical head so as to render the emitted laser beam into a pulsed laser beam. The first synchronizing signal generation circuit generates and provides to the drive circuit a first synchronizing signal for emitting the pulsed laser beam on the signal recording plane in reproduction. The first synchronizing signal is generated in synchronization with a signal reproduced from the signal recording plane by the pulsed laser beam.

According to another aspect of the present invention, an information recording and reproduction apparatus for an information recording medium includes an optical head, an information reproduction circuits a drive circuit, and a first synchronizing signal generation circuit. The optical head emits a laser beam on a plane of an information recording medium on which signal is recorded and detects the laser beam reflected at the signal recording plane. The information reproduction circuit reproduces information from the laser beam detected by the optical head. The drive circuit drives the optical head so as to render the emitted laser beam into a pulsed laser beam. The first synchronizing signal generation circuit generates and provides to the drive circuit a first synchronizing signal for emitting the pulsed laser beam on a signal recording plane in reproduction. The first synchronizing signal is generated in synchronization with a signal reproduced from the signal recording plane by the pulsed laser beam. The optical head is controlled so that a laser beam formed of a main lobe and side lobes is emitted on a signal recording plane by having the inner portion blocked of the laser beam emitted from the optical head only in reproduction.

According to a further aspect of the present invention, an information recording and reproduction apparatus for an information recording medium having a reference information signal of a predetermined cycle recorded in advance on the surface includes an optical head, an information reproduction circuit, a drive circuit, and an external synchronizing signal generation circuit. The optical head emits a laser beam on a plane of the information recording medium where a signal is recorded and detects the laser beam reflected from the signal recording plane. The information reproduction circuit reproduces information from the laser beam detected by the optical head. The drive circuit drives the optical head so as to render the emitted laser beam into a pulsed laser beam. The external synchronizing signal generation circuit generates and provides to the drive circuit an external synchronizing signal for emitting the pulsed laser beam on a signal recording plane in reproduction. The external synchronizing signal is generated in synchronization with a reference information signal reproduced from the information recording medium by a pulsed laser beam.

According to a further aspect of the present invention, the information recording and reproduction apparatus further includes a duty correction circuit for correcting the duty of a synchronizing signal.

According to still another aspect of the present invention, an information recording and reproduction apparatus further includes a second synchronizing signal generation circuit to delay a synchronizing signal for a predetermined time period to generate and provide to the information reproduction circuit a second synchronizing signal. The information reproduction circuit reproduces information in synchronization with the second synchronizing signal.

A main advantage of the present invention is to suppress increase of a laser spot on a signal plane of a medium by emitting a pulsed laser beam in reproduction to allow reproduction of information from a smaller domain.

Another advantage of the present invention is to suppress reduction in laser output, allow increase in the lifetime of the semiconductor laser, and allow reduction in power consumption by a pulse drive of the semiconductor laser at the time of reproduction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A–6C are diagrams for describing the relationship of a magnetic field, a pulse laser beam, and a record domain.

FIGS. 7A–7C are diagrams showing the relationship of a record domain, a reproduction laser beam, and a reproduction signal waveform when a laser beam is continuously emitted in reproduction.

FIGS. 8A–8D are diagrams showing the relationship of a record domain, a pulse laser beam, a pulse reproduction waveform, and a reproduction signal waveform when a pulsed laser beam is emitted in reproduction.

FIGS. 12A–12C are diagrams showing reproduction signal waveforms from a large domain and a small domain of a magnetically induced superresolution magneto-optical disk when a pulsed laser beam is emitted in reproduction.

FIGS. 31A–31F are timing charts for describing an operation of the external synchronizing signal generation circuit of FIG. 30.

FIGS. 32A–32C are timing charts for describing an operation of the synchronizing signal input circuit of FIG. 27.

FIGS. 33A–33C are timing charts for describing the necessity of an external synchronizing signal.

FIGS. 37A–37B are timing charts for describing an operation of the second synchronizing signal generation circuit of FIG. 36.

DESCRIPTION OF THE PREFERRED EMBODIMENTS

The present invention relates to an information recording and reproduction information that reproduces information at high density from a recording medium such as a magneto-optical recording medium or a phase transition recording medium on which information is recorded at high density. First, specific examples of a magneto-optical recording medium and a phase transition recording medium used in the information recording and reproduction apparatus of the embodiments of the present invention will be described.

An example of a stacked layer structure of a magnetically induced superresolution magneto-optical recording medium used in the embodiments of the present invention will be described with reference to FIG. 1. The magnetically induced superresolution magneto-optical medium disk used in the embodiment is a magneto-optical recording medium that allows high density recording, including a magnetic multilayer film formed of a recording layer and a reproduction layer.

Figure 1:
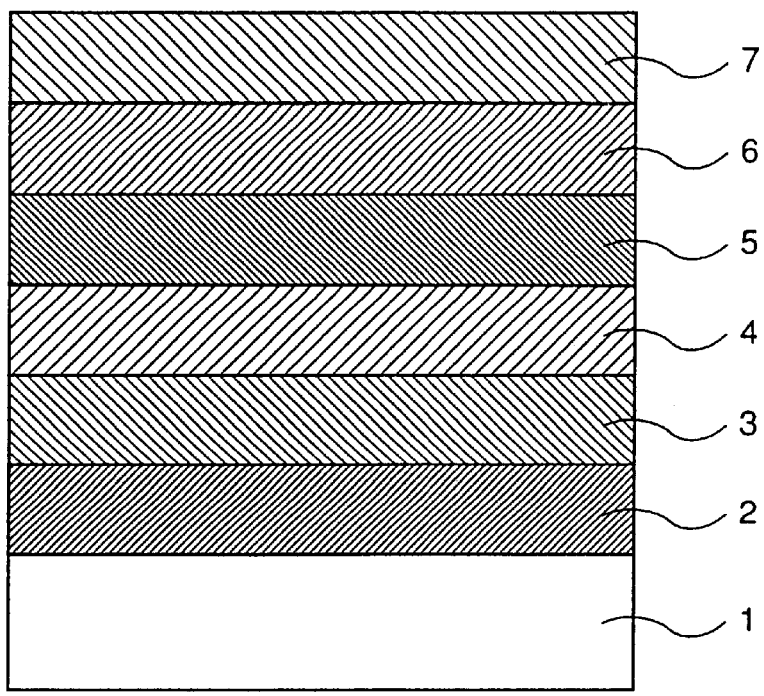
FIG. 1 is a sectional view of an example of a stacked layer structure of a magnetically induced superresolution magneto-optical recording medium used in embodiments of the present invention.

Referring to FIG. 1, the magnetically induced superresolution magneto-optical recording medium includes a substrate 1 formed of a transmissive polycarbonate, glass, and the like, a first dielectric layer 2 formed of SiN on substrate 1, a reproduction layer 3 formed of GdFeCo on first dielectric layer 2, a recording layer 4 formed of TbFeCo on reproduction layer 3, a second dielectric layer 5 formed of SiN on recording layer 4, a heat radiating layer 6 formed of a metal having a high thermal conductivity such as Al on second dielectric layer 5, and a protection layer 7 formed of ultraviolet curing resin on heat radiating layer 6.

First and second dielectric layers 2 and 5 each have a film thickness of 800 Å (tolerable error ±10 Å). Reproduction layer 3 has a film thickness of 1000 Å (tolerable error ±10 Å). Recording layer 4 has a film thickness of 500 Å (tolerable error ±10 Å). Heat radiating layer 6 has a film thickness of 200 Å (tolerable error ±10 Å). Protection layer 7 has a film thickness of 10 $\mu$m (tolerable error ±1 $\mu$m).

An example of a stacked layer structure of a general magneto-optical recording medium which is not a magnetically induced superresolution magneto-optical recording medium, used in the embodiment of the present invention will be described with reference to FIG. 2.

Figure 2:
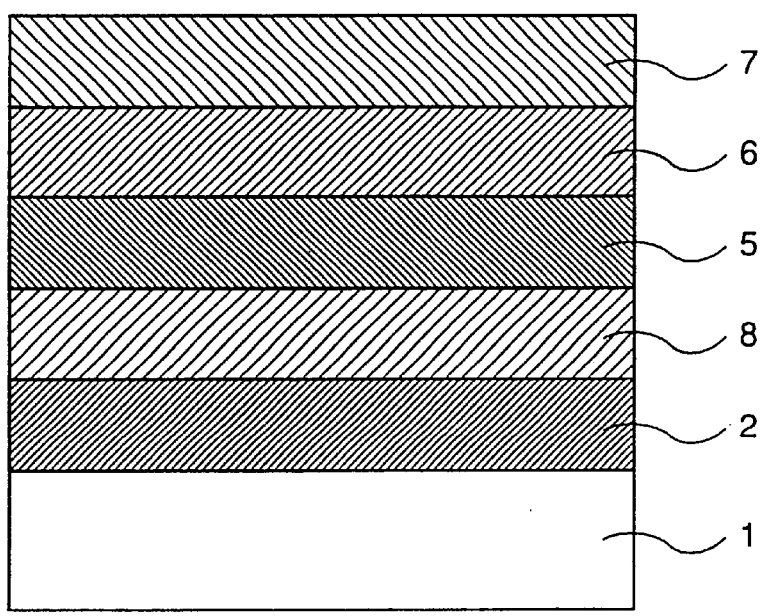
FIG. 2 is a sectional view of an example of a stacked layer structure of a general magneto-optical recording medium used in embodiments of the present invention.

Referring to FIG. 2, the general magneto-optical recording medium includes a substrate 1, a first dielectric layer 2 formed of SiN on substrate 1, a recording-reproduction layer 8 formed of TbFeCo on first dielectric layer 2, a second dielectric layer 5 formed of SiN on recording-reproduction layer 8, a heat radiating layer 6 formed of a metal of high thermal conductivity such as Al on second dielectric layer 5, and a protection layer 7 formed of ultraviolet curing resin on heat radiating layer 6.

According to the structure shown in FIG. 2, recording-reproduction layer 8 has a film thickness of 800 Å (tolerable error ±10 Å). The remaining layers have a film thickness identical to the film thickness of corresponding layers of FIG. 1.

Another example of a stacked layer structure of a magneto-optical recording medium used in the embodiment of the present invention will be described with reference to FIG. 3.

Figure 3:
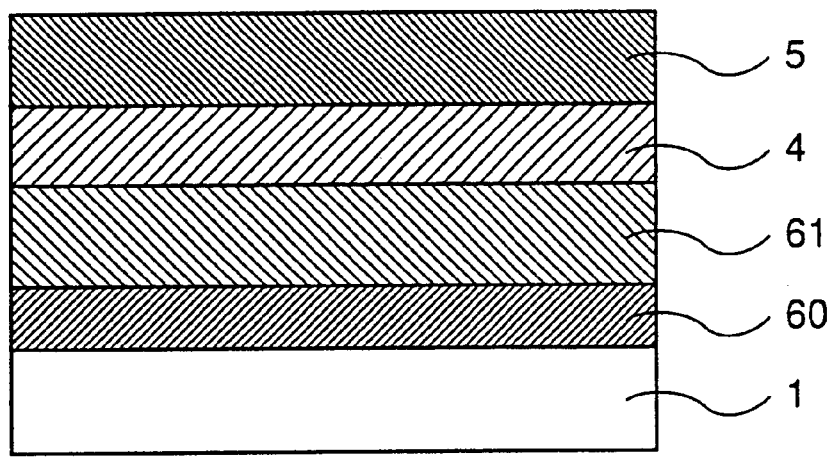
FIG. 3 is a sectional view of another example of a stacked layer structure of a magneto-optical recording medium used in embodiments of the present invention.

Referring to FIG. 3, the magneto-optical recording medium includes a glass substrate 1, an underlying layer 60 formed of Al deposited on glass substrate 1, a reproduction layer 61 formed of PdCo deposited on underlying layer 60, a recording layer 4 formed of TbFeCo deposited on reproduction layer 61, and a protection layer 5 formed of SiN deposited on recording layer 4.

In the magneto-optical recording medium shown in FIG. 3, information recorded at recording layer 4 is transferred to reproduction layer 61 by the exchange-coupling force generated by emission of a laser beam and reproduced at the time of reproduction. The PdCo forming reproduction layer 61 has the property of being converted into a magnetic thin film with intra-plane magnetization or with perpendicular magnetization according to the stress applied to the layer. The stress applied to the layer includes tensile stress and compressive stress. The stress applied on reproduction layer 61 is determined according to the level of the thermal expansion coefficients of the PdCo forming reproduction layer 61 and underlying layer 60.

The thermal expansion coefficient of glass is approximately $0.5 \times 10^{-6}$ (1/° C.), which is extremely smaller than the thermal expansion coefficient of PdCo which is approximately $12 \times 10^{-6}$ (1/° C.). When PdCo is directly deposited on glass substrate 1, tensile stress is exerted at PdCo when the temperature is reduced from the temperature of deposition to room temperature. In the example shown in FIG. 3, since Al layer 60 (thermal coefficient is $24 \times 10^{-6}$ (1/° C.)) is formed between the glass substrate 1 and the PdCo layer 61, the difference in thermal expansion coefficient becomes larger, resulting in greater tensile stress. By this tensile stress and by the magnetic strain coefficient of PdCo being as high as $3.5 \times 10^{-5}$, perpendicular magnetization anisotropy is exhibited at PdCo, so that reproduction layer 61 becomes a magnetic thin film with perpendicular magnetization at room temperature. By increasing the temperature of the PdCo which is a magnetic thin film with perpendicular magnetization at room temperature to a level higher than the temperature of deposition, the PdCo is rendered to a magnetic thin film with intra-plane magnetization to allow reproduction from reproduction layer 61.

An example of a stacked layer structure of a phase transition recording medium used in the embodiment of the present invention will be described with reference to FIG. 4.

Figure 4:
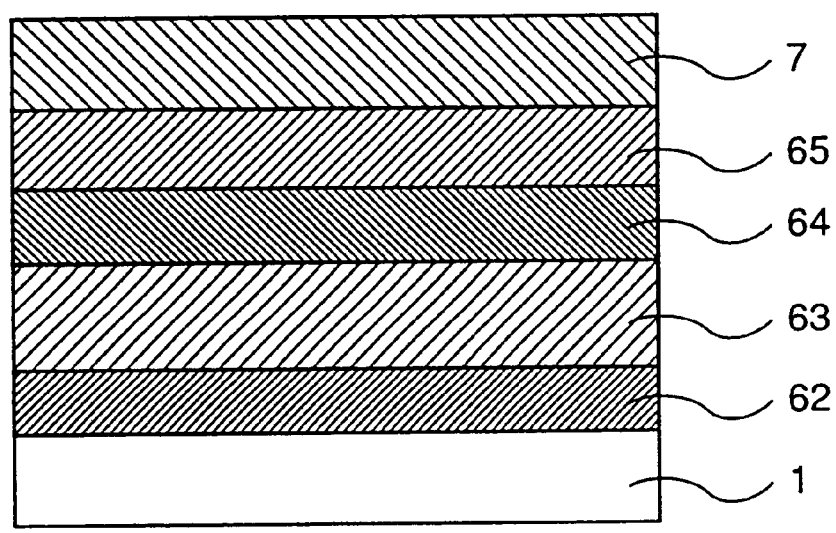
FIG. 4 is a sectional view of an example of a stacked layer structure of a phase transition recording medium used in embodiments of the present invention.

Referring to FIG. 4, this phase transition recording medium includes a substrate 1 formed of transmissive polycarbonate, a protection film 62 formed of $ZnS-SiO_2$ on substrate 1, a recording layer 63 formed of $Ge_2Sb_2Te_5$ on protection film 62, a protection film 64 formed of $ZnS-SiO_2$ on recording layer 63, a reflection film 65 formed of $Al_{95}Ti_5$ on protection film 64, and an ultraviolet curing resin 7 formed on reflection film 65.

Protection film 62 has a film thickness of 200 nm (tolerable error ±10 nm). Recording layer 63 has a film thickness of 20 nm (tolerable error ±5 nm). Protection film 64 has a film thickness of 15 nm (tolerable error ±5 nm). Reflection film 65 has a film thickness of 100 nm (tolerable error ±10 nm).

The phase transition recording medium has information recorded by the phase transition of a recording layer of the medium taking into consideration difference in the reflectance of the laser beam between an amorphous state and a crystalline state.

As to each of the stacked layers, first and second dielectric layers 2 and 5, reproduction layers 3 and 61, recording layers 4 and 63, recording-reproduction layer 8, and heat radiating layer 6 are formed by RF magnetron sputtering.

The entire structure of an information recording and reproduction apparatus for a magneto-optical recording medium or a phase transition recording medium according to a first embodiment of the present invention will be described hereinafter with reference to FIG. 5. Description is provided for recording and reproducing to and from a magneto-optical disk as a magneto-optical recording medium in the following embodiments.

Figure 5:
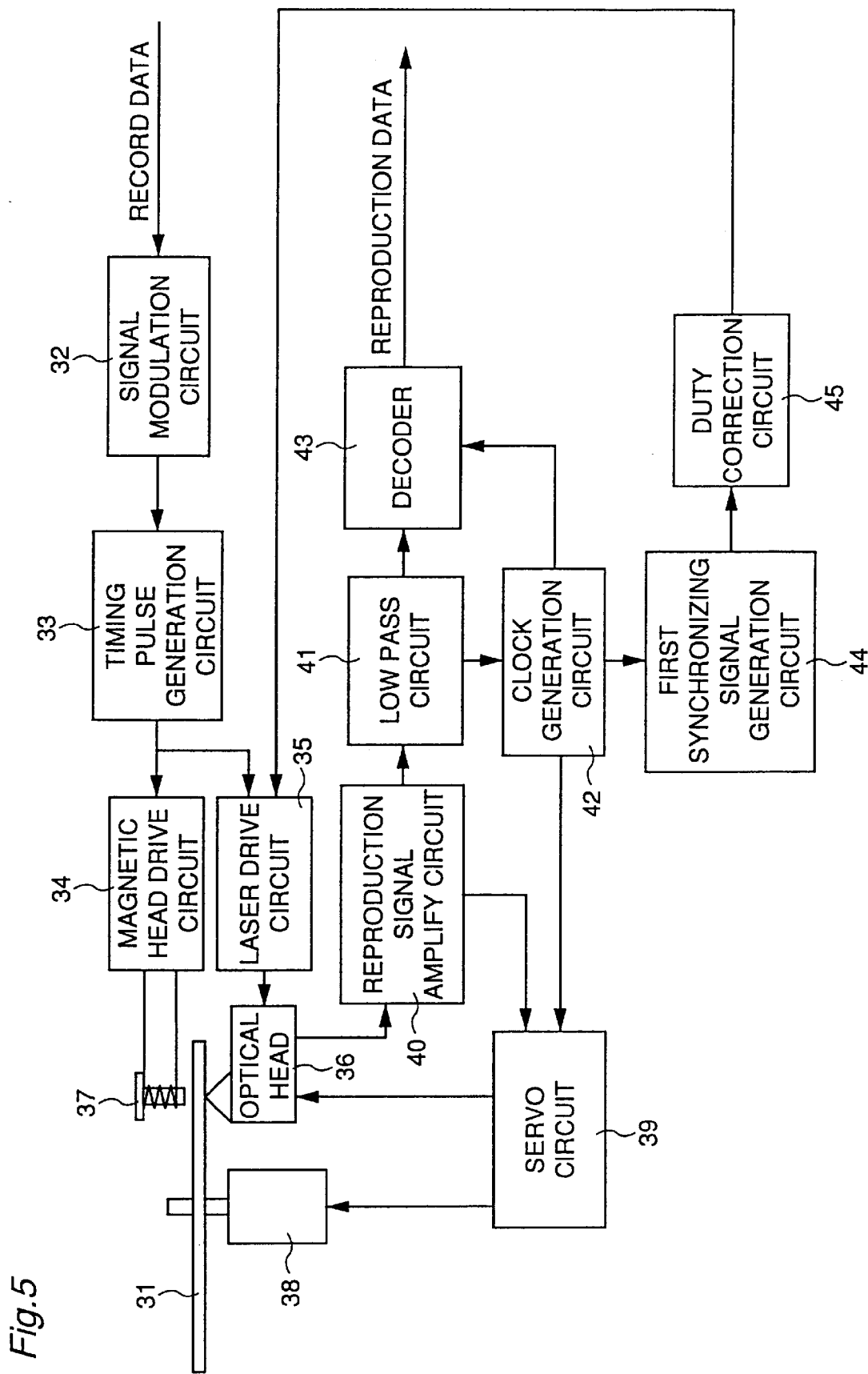
FIG. 5 is a block diagram showing an entire structure of an information recording and reproduction apparatus according to a first embodiment of the present invention.

Referring to FIG. 5, the information recording and reproduction apparatus includes a signal modulation circuit 32, a timing pulse generation circuit 33, a magnetic head drive circuit 34, a laser drive circuit 35, an optical head 36, a magnetic head 37, a spindle motor 38, a servo circuit 39, a reproduction signal amplify circuit 40, a low pass circuit 41, a clock generation circuit 42, a decoder 43, a first synchronizing signal generation circuit 44, and a duty correction circuit 45.

A recording operation of the information recording and reproduction apparatus of FIG. 5 will first be described. Data representing information to be recorded is applied to signal modulation circuit 32 to be modulated according to a 1-7RLL method, for example. The modulated data is provided to timing pulse generation circuit 33 to be modified into a pulse signal having a predetermined duty ratio and to have a predetermined phase difference set. The pulse signal is applied to magnetic head drive circuit 34 and laser drive circuit 35.

Laser drive circuit 35 responds to the applied pulse signal to drive a semiconductor laser (not shown) in optical head 36. A laser beam is emitted on a magneto-optical disk 31 which is a magneto-optical recording medium shown in FIGS. 1–3, for example. Magnetic head drive circuit 34 also responds to the applied pulse signal to drive magnetic head 37, whereby a record signal is recorded on magneto-optical disk 31. The relationship between the magnetic field applied to the magneto-optical disk and the laser beam is as shown in FIGS. 6A and 6B. More specifically, the magnetic field applied by magnetic head 37 is inverted in a pulsive manner between the south pole and the north pole. Since there is a transition region at the time of inversion, control is provided to suppress optical head 36 from emitting a laser beam during the period corresponding to the transition region.

It is to be noted that information to be recorded is not limited to an image signal, and may be any signal such as an audio signal or a data signal.

A reproduction operation of the information recording and reproduction apparatus of FIG. 5 will be described hereinafter.

A laser beam emitted from a semiconductor laser (not shown) in optical head 36 passes.through an objective lens (not shown) in optical head 36 to be emitted on a recording plane of magneto-optical disk 31. Reflected light from the recording plane is detected by a photodetector (not shown) in optical head 36. As a result, a reproduction signal and various error signals are obtained from optical head 36.

The reproduction signal and error signals obtained from optical head 36 are provided to reproduction signal amplify circuit 40 to be amplified. The amplified reproduction signal is provided to low pass circuit 41, and the amplified error signals are applied to servo circuit 39. Low pass filter 41 integrates the applied reproduction signal to provide the same to decoder 43 and clock generation circuit 42. Clock generation circuit 42 extract a clock signal from the applied reproduction signal. That clock signal is applied to servo circuit 39, decoder 43, and synchronizing signal generation circuit 44 as an internal clock signal.

Servo circuit 39 rotates spindle motor 38 at a predetermined speed of rotation, and also controls the objective lens in optical head 36 to effect tracking servo control and focus servo control according to error signals from reproduction signal amplify circuit 40 and a clock signal from clock generation circuit 42. Decoder 43 decodes the reproduction signal from low pass circuit 41 under the 1-7 method in synchronization with the clock signal generated by clock generation circuit 42 to output the same as reproduced data.

Synchronizing signal generation circuit 44 generates a synchronizing signal to emit a pulsed laser beam according to a clock signal provided from clock generation circuit 42. The generated synchronizing signal is applied to duty correction circuit 45. In response, duty correction circuit 45 generates a pulse signal with a predetermined duty ratio, which is provided to laser drive circuit 35. Laser drive circuit 35 provides control of optical head 36 according to the applied pulse signal to emit a pulsed laser beam in reproduction. The specific means for providing a pulsed laser beam will be described afterwards.

The present invention is characterized in carrying out information reproduction at high density by emitting a pulsed laser beam from an optical head at the time of reproduction. FIGS. 7A–7C and FIGS. 8A–8D show respective reproduction signal waveforms when information is reproduced from the same record domain using a continuous laser beam and a pulsed laser beam. The pulsed reproduction waveforms of FIG. 8C represent waveform of the output of reproduction signal amplify circuit 40. As seen from FIG. 8D, the recorded information can be sufficiently reproduced even when such pulse laser beam is used for reproduction.

A modification of the first embodiment of the present invention will be described with reference to FIG. 9. The information recording and reproduction apparatus of FIG. 9 has a structure similar to that of the first embodiment shown in FIG. 5 except for the following points. Description of common elements will not be repeated.

Figure 9:
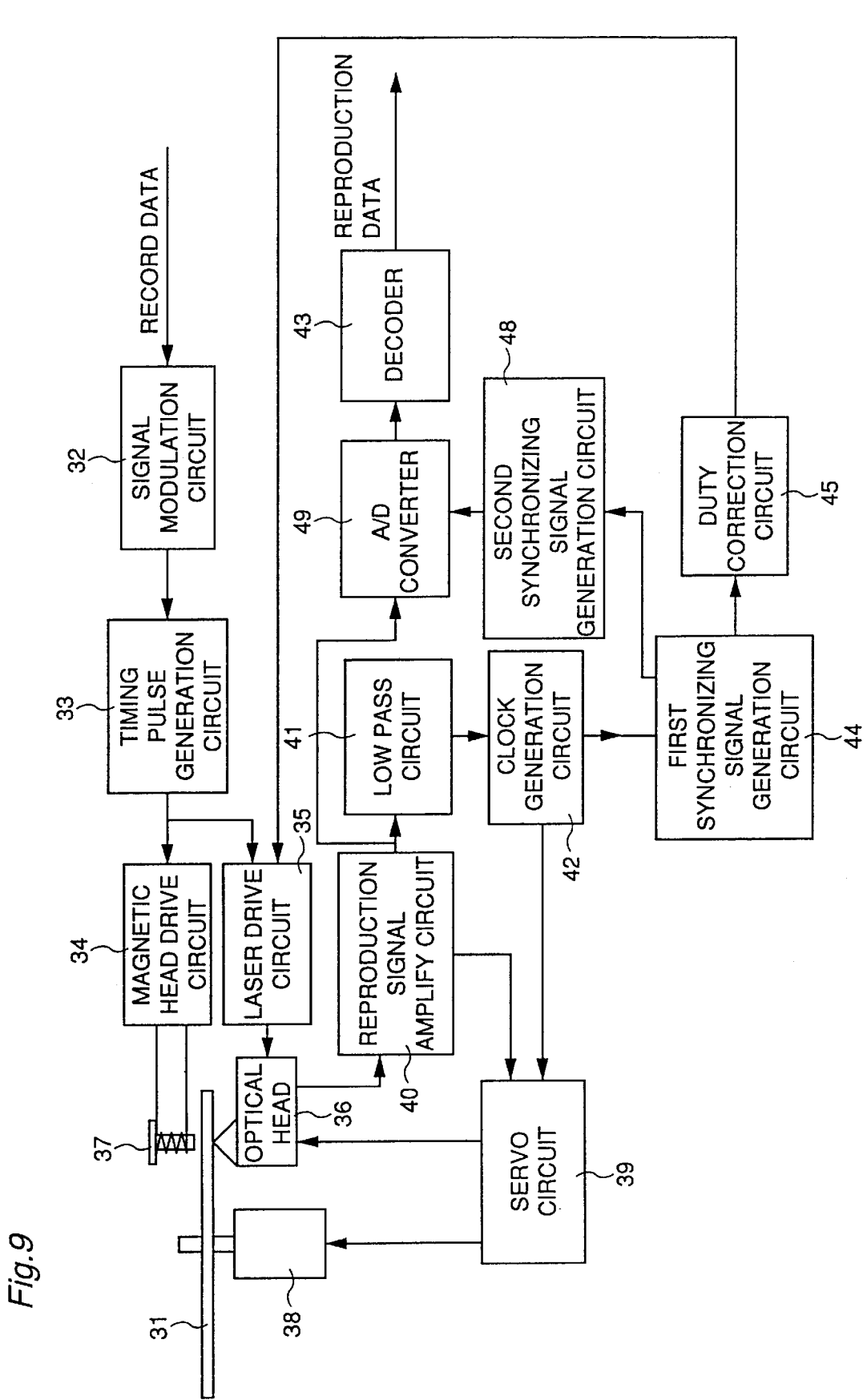
FIG. 9 is a block diagram showing a modification of the information recording and reproduction apparatus of the first embodiment shown in FIG. 5.

The information recording and reproduction apparatus of FIG. 9 has the reproduced signal from reproduction signal amplify circuit 40 applied to a low pass circuit 41 and also to an A/D converter 49. The reproduction signal integrated at A/D converter 49 is applied to the next-stage decoder 43, to be demodulated.

The reproduction signal applied to low pass circuit 41 is integrated similarly as in the first embodiment shown in FIG. 5 to be applied to clock generation circuit 42. The output of clock generation circuit 42 is applied to first synchronizing signal generation circuit 44 as in the first embodiment of FIG. 5. It is to be noted that in the modification of FIG. 9, the output of first synchronizing signal generation circuit 44 is applied, not only to duty correction circuit 45, but also to a second synchronizing signal generation circuit 48. Second synchronizing signal generation circuit 48 delays an applied first synchronizing signal for a predetermined time period to generate a second synchronizing signal. The second synchronizing signal is applied to A/D converter 49. Similar to the embodiment of FIG. 5, duty correction circuit 45 generates and provides to laser drive circuit 35 a pulse signal having a predetermined duty according to the first synchronizing signal, whereby a pulsed laser beam is provided in reproduction.

Figures 10A, 10B, 10C:
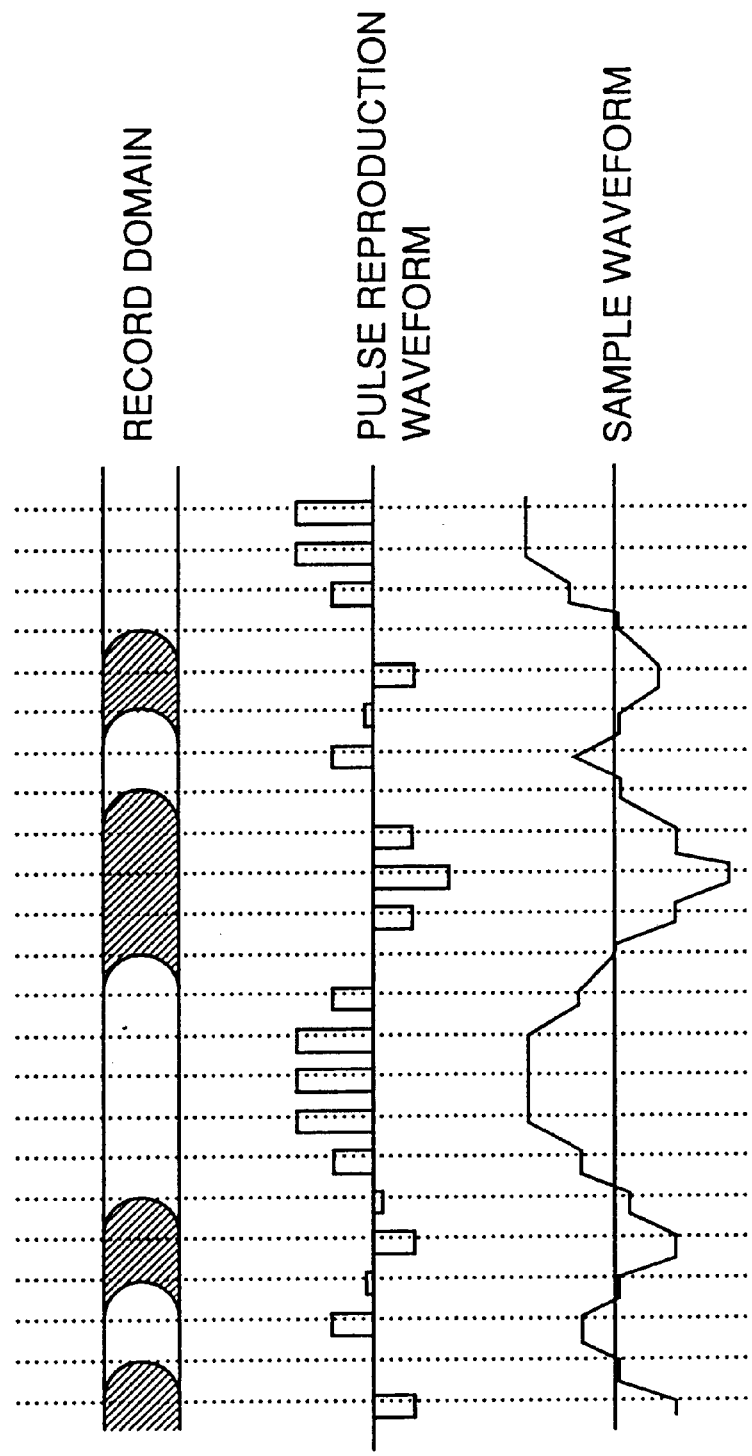
FIGS. 10A–10C are diagrams showing the relationship of a record domain, a pulse reproduction waveform, and a sample waveform when a pulsed laser beam is emitted in reproduction.

A/D converter 49 detects and integrates a reproduction signal provided from reproduction signal amplify circuit 40 in synchronization with a second synchronizing signal applied from second synchronizing signal generation circuit 48. FIGS. 10A–10C shows pulsed reproduction waveform obtained from reproduction signal amplify circuit 40 and sample waveform that is held by A/D converter 49 when information is reproduced by a pulsed laser beam from a record domain identical to that of FIGS. 7A and 8A. A/D converter 49 sample-holds the pulsed reproduction waveform and then applies an integration process thereon. The integrated signal is applied to decoder 43 of the next stage.

Figure 11A:
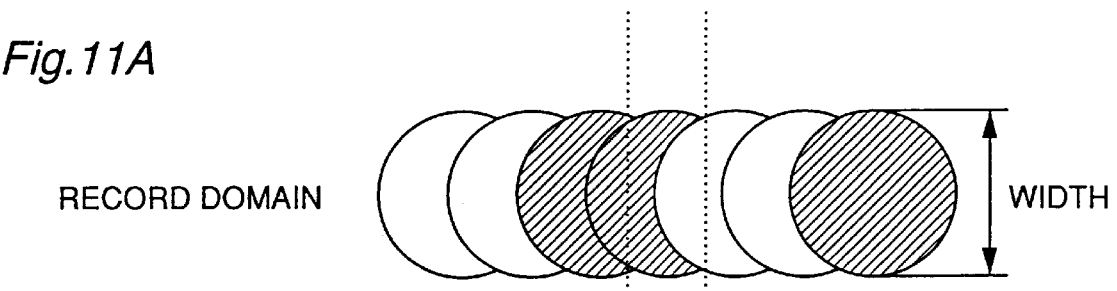
FIGS. 11A–11D are diagrams showing reproduction signal waveforms of a general magneto-optical disk and a magnetically induced superresolution magneto-optical disk when a pulsed laser beam is emitted in reproduction.
Figure 11B:
Figure 11C:
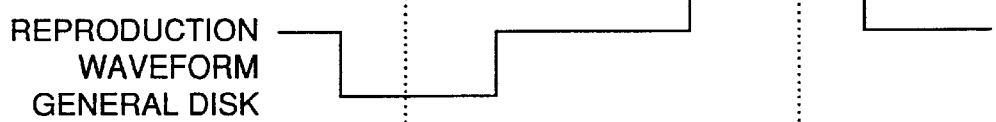

The function of second synchronizing signal generation circuit 48 and A/D converter 49 of the embodiment of FIG. 9 will be described hereinafter. The embodiment of FIG. 9 shows an information recording and reproduction apparatus that is particularly effective in reproducing information from the magnetically induced superresolution magneto-optical recording medium shown in FIG. 1. When the record domain shown in FIG. 11A is reproduced by a pulsed laser beam shown in FIG. 11B, a reproduction waveform thereof is shown in FIG. 11C with respect to a general magneto-optical disk and in FIG. 11D with respect to a magnetically induced superresolution disk.

In the case of a general magneto-optical disk, emission of a pulsed laser beam on the disk causes increase in temperature at a predetermined reproduction region on the disk to reproduce information therefrom. This predetermined reproduction area attaining a high temperature will not increase over the time period of the emitted pulsed beam. Therefore, the reproduced waveform from a general magneto-optical disk shows a rectangular reproduced waveform. In contrast, when a pulsed laser beam is emitted on a magnetically induced superresolution disk, the region (window) of the reproduction layer from which information is reproduced increases over the emitted time at each pulse of the laser beam. Therefore, the reproduced waveform for each pulse becomes greater over time.

Thus, the reproduction characteristics can be improved by detecting a reproduction signal at a timing where the reproduction waveform becomes greater and takes a constant value for each pulse in reproducing information from a magnetically induced superresolution disk.

Figure 11D:
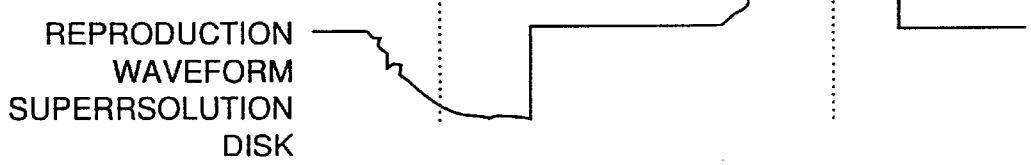

For this purpose, in the information recording and reproduction apparatus of FIG. 9, first synchronizing signal generation circuit 44 generates a first synchronizing signal required to provide a pulsed beam according to an internal clock signal applied from clock generation circuit 42. The first synchronizing signal is applied to duty correction circuit 45 and second synchronizing signal generation circuit 48. Second synchronizing signal generation circuit 48 delays the received first synchronizing signal for a predetermined time period to provide to A/D converter 49 a second synchronizing signal for sample-holding a reproduction waveform at a timing where the reproduced waveform becomes greater to take a constant value as shown in FIG. 11D. As a result, A/D converter 49 can detect and integrate a reproduction waveform at a timing where the reproduction waveform is greatest. In other words, the reproduction characteristics can be improved.

FIGS. 12A–12C show reproduced waveforms from a large domain and a small domain recorded on a magnetically induced superresolution disk. When information is to be reproduced from a large record domain as shown in FIG. 12B, the reproduced waveform becomes greater over the beam emitted time to take a constant value for each pulse of the laser beam. When information is to be reproduced from a small record domain, the reproduced waveform will take a maximum value for each pulse of the laser beam. Therefore, in the embodiment shown in FIG. 9, A/D converter 49 must detect a reproduced waveform at a timing where the reproduced waveform from the smallest domain takes the maximum value. Although the reproduced waveform from the larger record domain does not necessarily reach the maximum value at this timing, reproduction can be carried out sufficiently since the record domain is large. Second synchronizing signal generation circuit 48 has the delay time determined so as to generate a second synchronizing signal that allows sample-holding of a reproduced pulse waveform at a timing where the reproduced waveform is greatest.

Figure 13:
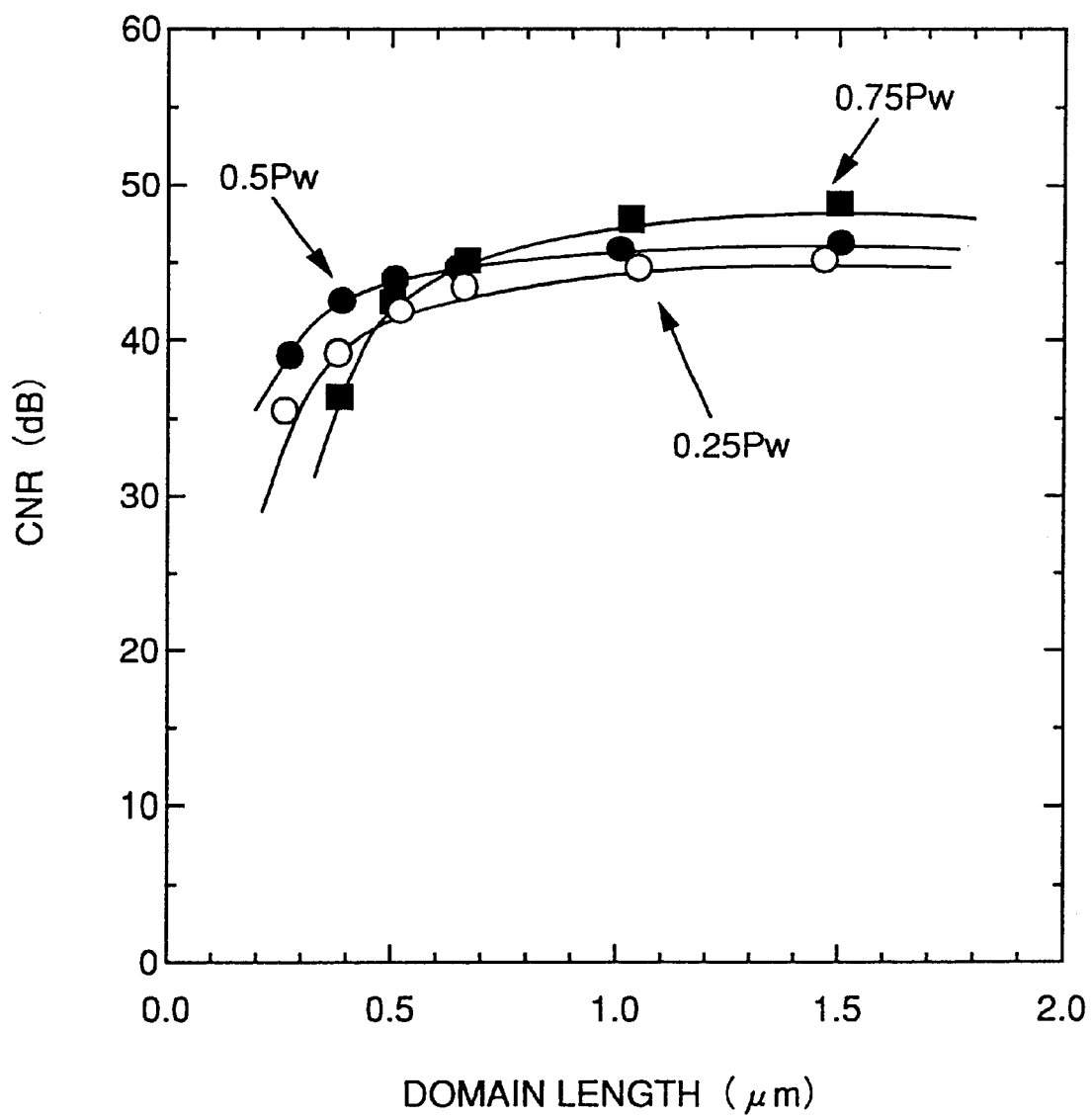
FIG. 13 is a diagram showing the relationship between the CN ratio and domain length when a pulsed laser beam is emitted in reproduction.

The relationship between the CN ratio and the domain length when information is reproduced using a pulsed laser beam will be described hereinafter with reference to FIG. 13. The delay time of the second synchronizing signal from the timing the pulse laser is turned on by the first synchronizing signal is employed as the parameter. A delay time of 0.25 Pw (Pw: duration time of pulse light), 0.5 Pw, and 0.75

Pw are taken as the parameter. In a region of a small domain length, the CN ratio in reproduction is at least 40 dB when the delay time is 0.5 Pw. In the region of a long domain length, the CN ratio in reproduction is at least 40 dB when the delay time is in the range of 0.25 Pw~0.75 Pw. Therefore, detection of a reproduced pulse waveform is effected at the timing of a second synchronizing signal that is a delayed version of the first synchronizing signal by 0.25~0.75 times the pulse light duration time Pw.

According to the above-described first embodiment and modification thereof, information can be detected with reproduction characteristics of a sufficient level even with respect to domains of a length smaller than 0.40 μm which was the shortest domain length allowed in conventional reproduction.

An information recording and reproduction apparatus according to a second embodiment of the present invention will be described hereinafter with reference to FIG. 14. The entire structure of the information recording and reproduction apparatus of the second embodiment is similar to the entire structure of the first embodiment shown in FIG. 5. In the second embodiment, optical head 36 has a characteristic structure. Therefore, description of the entire structure of the information recording and reproduction apparatus of the second embodiment will not be repeated. Only the structure of optical head 36 will be described with reference to FIG. 14. Although description is provided of reproducing information from a magneto-optical recording medium, the same can be applied in reproducing information from a phase transition recording medium.

Figure 14:
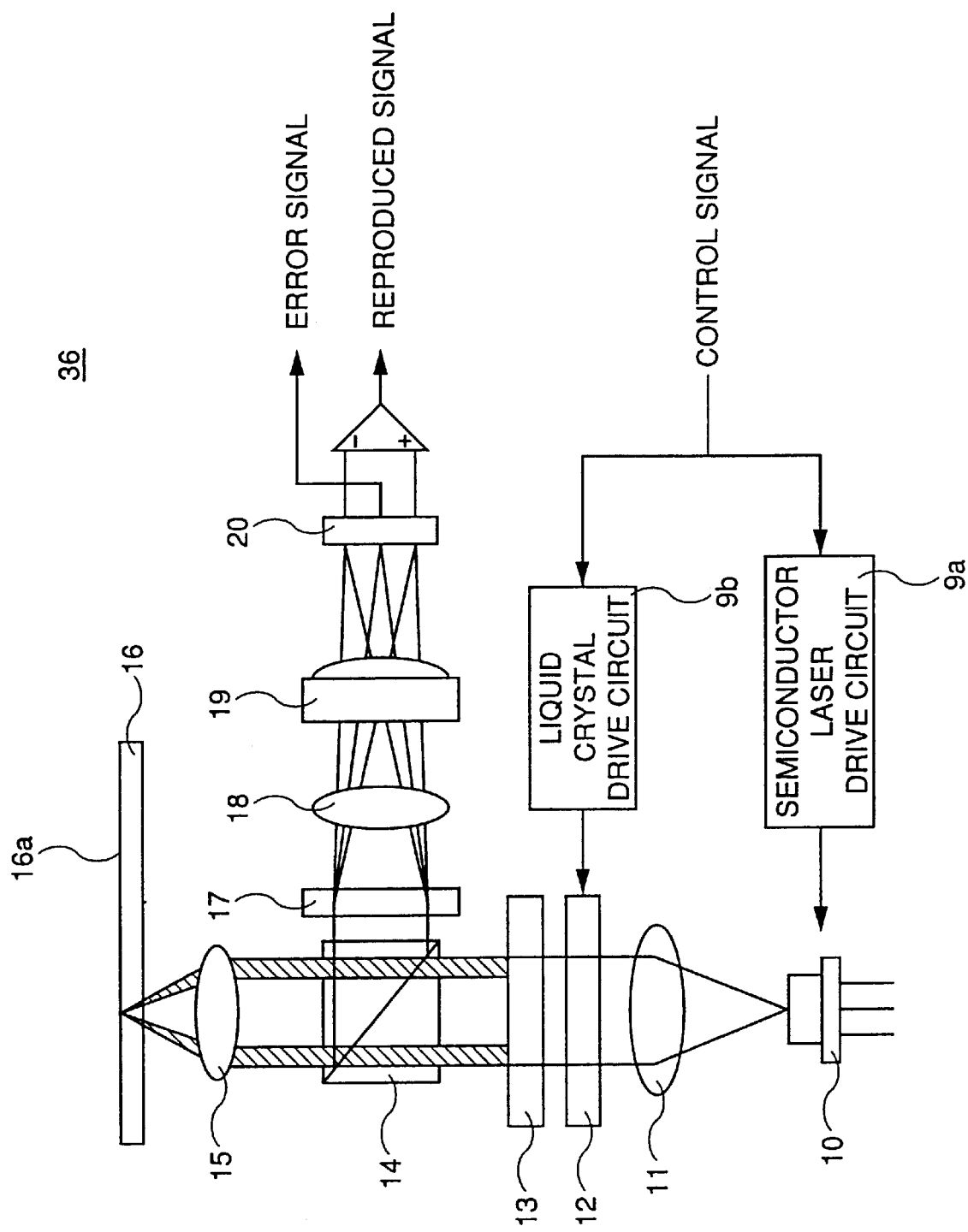
FIG. 14 is a block diagram showing a structure of an optical system used in an information recording and reproduction apparatus according to a second embodiment of the present invention.

In optical head 36 of FIG. 14, a laser beam having a wavelength of 6BOnm (tolerable error ±15 nm) generated from a semiconductor laser 10 driven by a semiconductor laser drive circuit 9a receiving a control signal from a laser drive circuit 35 of FIG. 10 is rendered parallel by a collimator lens 11. The parallel beam passes through a polarization plane rotary unit 12, a polarizing filter 13, and a half mirror 14 to enter objective lens 15. The laser beam is focused by objective lens 15 to be emitted on a recording plane 16a through a substrate 16 of a disk which is an magneto-optical recording medium.

The laser beam reflected at recording plane 16a returns to half mirror 14 via substrate 16 and objective lens 15. Half of the laser beam is passed through half mirror 14, and the remaining half of the laser beam is reflected thereat. The laser beam reflected from half mirror 14 is collected through a Wollaston prism 17, a collection convergent lens 18 and a cylindrical lens 19 to enter a photodetector 20. A reproduction signal and error signals such as a tracking error signal and a focus error signal are detected by photodetector 20. In the present invention, the wavelength of the laser beam is 400–800 nm, preferably 600–700 nm, further preferably 620–650 or 665–695 nm.

Figure 15A:
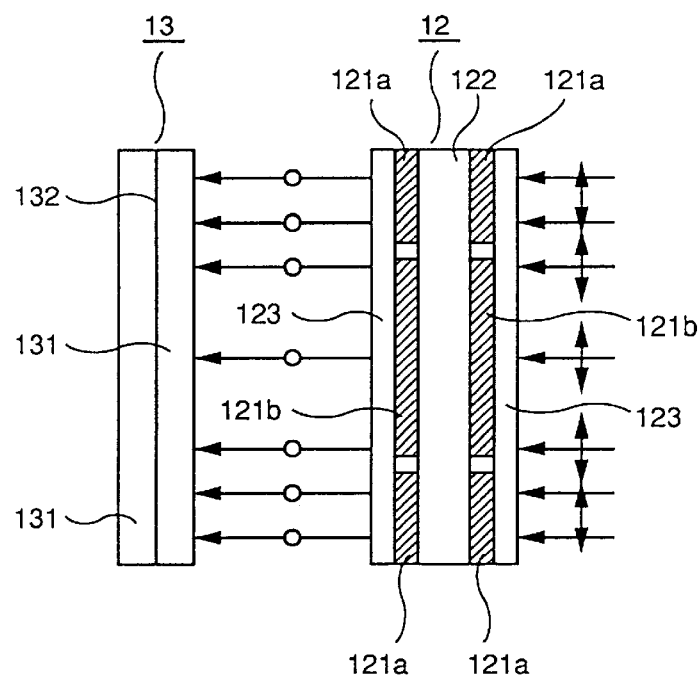
FIGS. 15A and 15B are diagrams showing the structure and driving states of the polarizing filter and polarization plane rotary unit of the optical system shown in FIG. 14.
Figure 15B:
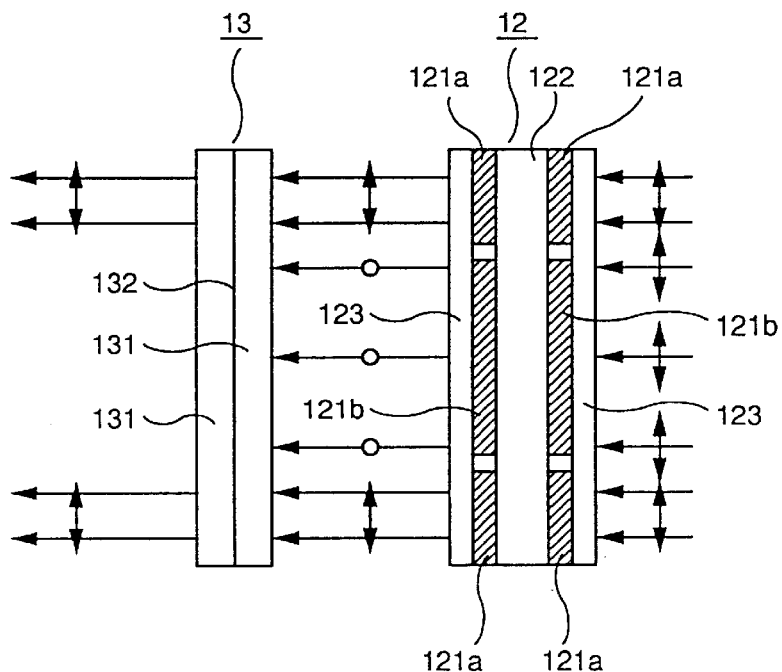

Polarizing filter 13 has a structure shown in FIGS. 15A and 15B. More specifically, a polarizing film 132 is sandwiched by the entire facing surfaces of a pair of transparent glass 131. This polarizing filter 132 has the property of transmitting only a laser beam that is polarized in a particular direction. Transparent glass 131 can be formed of any material that is transparent and has superior optical characteristics such as resin (polycarbonate, PMMA and the like).

Figure 16:
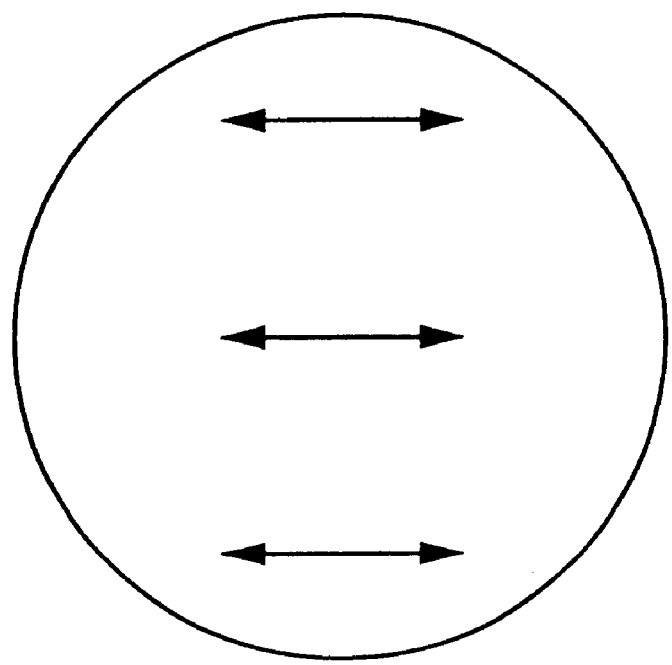
FIG. 16 is a schematic diagram showing the characteristics of a polarizing filter shown in FIGS. 15A and 15B.

FIG. 16 shows the polarization characteristics of polarizing filter 13. Polarizing filter 13 has the property of transmitting only a laser beam that is polarized in a particular direction by polarizing film 132. In the embodiment that will be described hereinafter, it is assumed that polarizing filter 13 transmits only a laser beam that has a plane of polarization parallel to the sheet of the drawing.

As shown in FIGS. 15A and 15B, polarization plane rotary unit 12 includes a pair of transparent glass plates 123, a pair of transparent electrodes 121, each formed at respective inner surfaces of glass plate 123, and a TN (twisted nematic) type liquid crystal 122 sandwiched between the pair of transparent electrodes 121. Transparent electrode 121 has an outer portion 121a and an inner portion 121b patterned so that voltages can be applied individually to the inner portion and the outer portion.

A recording operation using the optical head shown in FIG. 14 will be described hereinafter. In recording, voltages are applied by a liquid crystal drive circuit 9b receiving a control signal from laser drive circuit 35 of FIG. 5 to outer portion 121a and inner portion 121b of the transparent electrode of polarization plane rotary unit 12. As a result, the laser beam entering TN type liquid crystal 122 parallel to the sheet of the drawing is transmitted without having its plane of polarization entirely rotated and enters polarizing film 132 of polarizing filter 13. Since polarizing film 132 transmits only a laser beam that is polarized in the direction parallel to the sheet of the drawing, the incident laser beam passes through polarizing filter 13 without being blocked to be emitted on a recording plane 16a of the magneto-optical disk via half mirror 14 and objective lens 15. Recording onto the magneto-optical disk is effected by applying a pulsed magnetic field. and a recording-oriented pulsed laser beam as described already with reference to FIGS. 6A and 6B. The duty of the pulsed magnetic field at the time of recording is 50%, and the duty of the pulsed laser beam for recording is 30%.

A reproduction operation of the optical head of FIG. 14 will be described hereinafter. In reproduction, a voltage is applied only to outer portion 121a of the transparent electrode as shown in FIG. 15B. No voltage is applied to inner portion 121b. As a result, the incident laser beam polarized in a direction parallel to the sheet of the drawing has its plane of polarization rotated 90° by TN type liquid crystal 122 only at its inner portion to be polarized in a direction perpendicular to the sheet of the drawing.

The laser beam passing through TN type liquid crystal 122 has its inner portion with a plane of polarization perpendicular to the drawing sheet blocked by polarizing film 132 of polarizing filter 13, and only its outer portion is transmitted. The laser beam transmitted through polarizing filter 13 passes through half mirror 14 and objective lens 15 to be emitted on recording plane 16a of the magneto-optical recording medium. Since the inner portion of the laser beam is blocked as described above, a laser beam having a main lobe and a pair of side lobes is emitted on recording plane 16a by the optical superresolution method.

In the second embodiment, the laser beam for reproduction is pulsed in synchronization with the first synchronizing signal generated by first synchronizing signal generation circuit 44, as in the previous first embodiment. A pulsed laser beam for reproduction is provided from the optical head of FIG. 14 as set forth in the following.

As previously described with reference to FIG. 15B, a laser beam formed of a main lobe and a pair of side lobes is emitted on a recording plane 16a of the magneto-optical disk when the voltage applied to inner portion 121b of the transparent electrode is turned off and the voltage applied to outer portion 121a of the transparent electrode is turned on. When the voltages applied to inner portion 121b and outer portion 121a of the transparent electrode are both turned off as shown in FIG. 15A, the laser beam polarizing in a direction parallel to the sheet of the drawing has its plane of polarization entirely rotated 90° by TN type liquid crystal 122, whereby the laser beam is entirely blocked by polarizing film 132 of polarizing filter 13. Therefore a pulsed laser beam for reproduction formed of a main lobe and a pair of side lobes can be provided by constantly turning off the voltage applied to inner portion 121b of transparent electrode, and turning on/off the voltage applied to outer portion 121a in synchronization with the first synchronizing signal generated by first synchronizing signal generation circuit 44.

As an alternative method of blocking the light of only the inner portion of the laser beam, the voltages applied to the inner portion 121b and outer portion 121a of the transparent electrode of polarization plane rotary unit 12 can be turned on/off simultaneously, and providing polarizing film 132 of polarizing filter 13 divided into an inner portion and an outer portion differing in polarization characteristics from each other.

When the numerical aperture of objective lens 15 is 0.55 (tolerable error ±0.1) and the diameter of the effective luminance flux is 4 mm, the diameter of the inner portion 121b of the transparent electrode is selected so that the beam diameter of the main lobe according to optical superresolution becomes 0.7–1.1 μm. When the diameter of the effective luminance flux is not 4 mm, the diameter of inner portion 121b is determined in proportion to the diameter of the effective luminance flux so that the beam diameter of the main lobe is 0.7–1.1 μm.

Figure 17A:
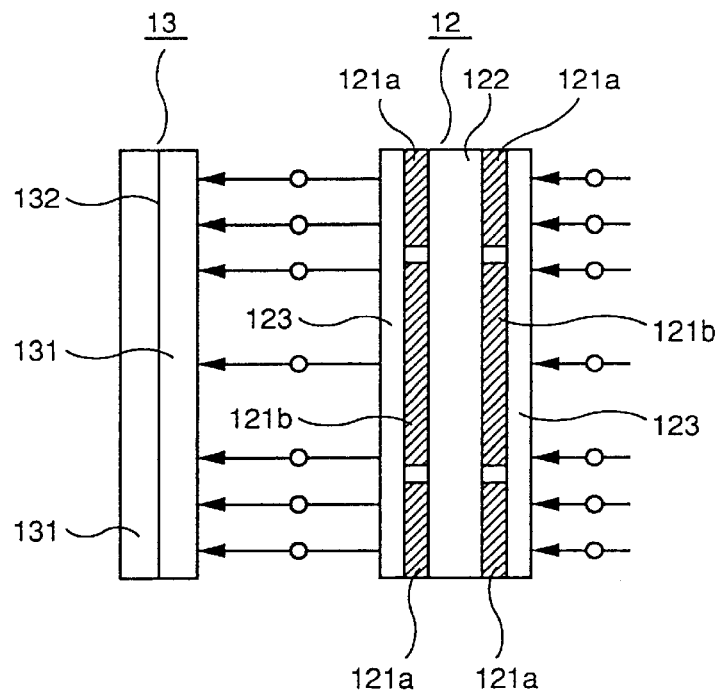
FIGS. 17A and 17B show another driving states of the polarization plane rotary unit of FIGS. 15A and 15B.

Although the laser beam entering polarization plane rotary unit 12 is described as being polarized in a direction parallel to the sheet of the drawing, the present invention is not limited to this direction of polarization. A laser beam that polarizes in a direction perpendicular to the sheet of the drawing can be used. In this case, the voltage applied to inner portion 121b of the transparent electrode is constantly turned on, and the voltage applied to outer portion 121a is turned on/off in synchronization with the first synchronizing signal at the time of reproduction as shown in FIGS. 17A and 17B.

Figure 17B:
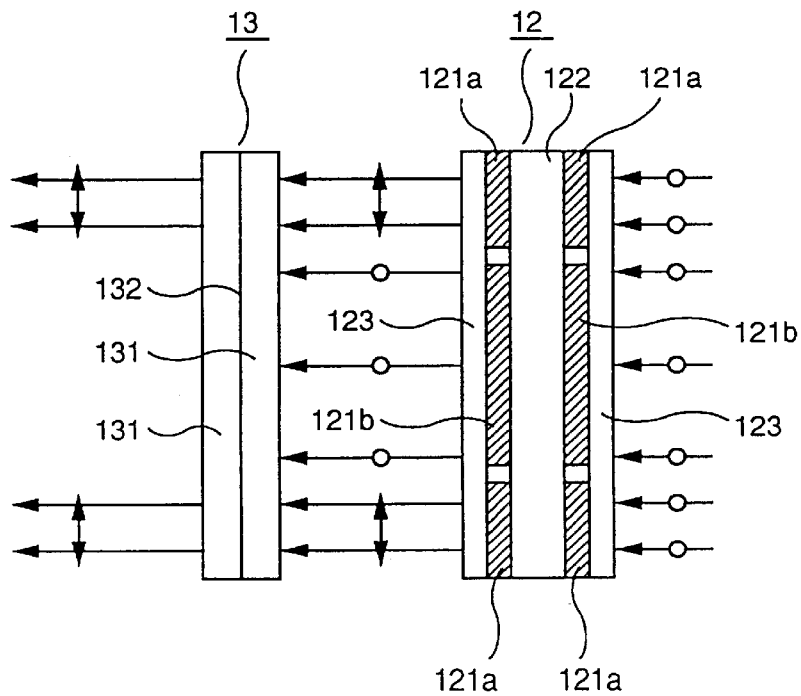

More specifically, as shown in FIG. 17B, turning off the voltage applied to outer portion 121a causes the laser beam that polarizes in a direction perpendicular to the sheet of the drawing to have the plane of polarization rotated 90° only at its outer portion by TN type liquid crystal 122 to be polarized in a direction parallel to the drawing sheet. As a result, the inner portion of the laser beam is blocked, and only the outer portion of the laser beam is transmitted through polarizing filter 13 by polarizing film 132 in polarizing filter 13. When the voltage applied to outer portion 121a is turned on, the laser beam polarizing in a direction perpendicular to the drawing sheet directly passes through TN type liquid crystal 122 without having its plane of polarization entirely rotated by TN type liquid crystal 122. As a result, the laser beam will be entirely blocked by polarizing film 132 of polarizing filter 13. Therefore, by turning on/off the voltage applied to outer portion 121a of the transparent electrode in synchronization with the first synchronizing signal during reproduction, a pulsed laser beam of a main lobe and a pair of side lobes according to the optical superresolution method can be provided even when a laser beam that polarizes in a direction perpendicular to the drawing sheet is used.

When the above-described laser beam polarized in a direction perpendicular to the drawing sheet is used, it is not necessary to provide the entire transparent electrode 121 and TN type liquid crystal 122 in polarization plane rotary unit 12. More specifically, TN type liquid crystal 122a and transparent electrode 121a are to be provided only for the region corresponding to the outer portion of the laser beam that polarizes in a direction perpendicular to the drawing sheet. When the voltage applied to transparent electrode 121a is turned off, the laser beam that polarizes in a direction perpendicular to the sheet of the drawing has the plane of polarization rotated 90° only at the outer portion by TN type liquid crystal 122a to be polarized in a direction parallel to the drawing sheet. The inner portion of the laser beam that is polarized in a direction perpendicular to the drawing sheet is directly transmitted. As a result, the laser beam has its inner portion blocked and only the outer portion transmitted by polarizing film 132 of polarizing filter 13.

When the voltage applied to outer portion 121a is turned on, the laser beam polarizing in a direction perpendicular to the drawing sheet is directly transmitted without having its plane of polarization entirely rotated by TN type liquid crystal 122a. The inner portion of the laser beam that polarizes in a direction perpendicular to the drawing sheet is directly transmitted. As a result, the laser beam is entirely blocked by polarizing film 132 of polarizing filter 13. Therefore, by turning on/off the voltage applied to the outer portion of transparent electrode 121a, a pulsed laser beam formed of a main lobe and a pair of side lobes can be obtained by the optical superresolution method.

The on/off of the voltages applied to transparent electrodes 121a and 121b is controlled by laser drive circuit 35 in synchronization with the first synchronizing signal applied from duty correction circuit 45 of the embodiments shown in FIGS. 6 and 9.

Figure 18A:
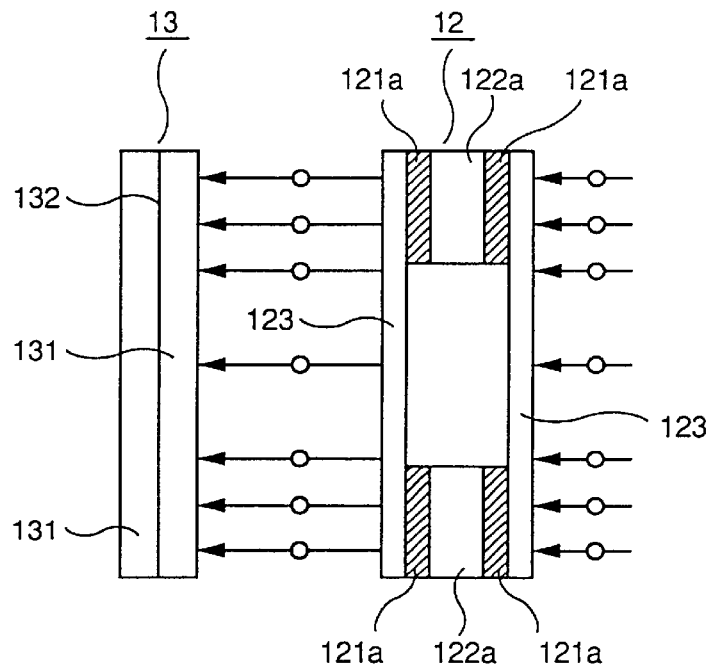
FIGS. 18A and 18B show another structure and driving states of the polarization plane rotary unit of the optical system of FIG. 14.
Figure 18B:
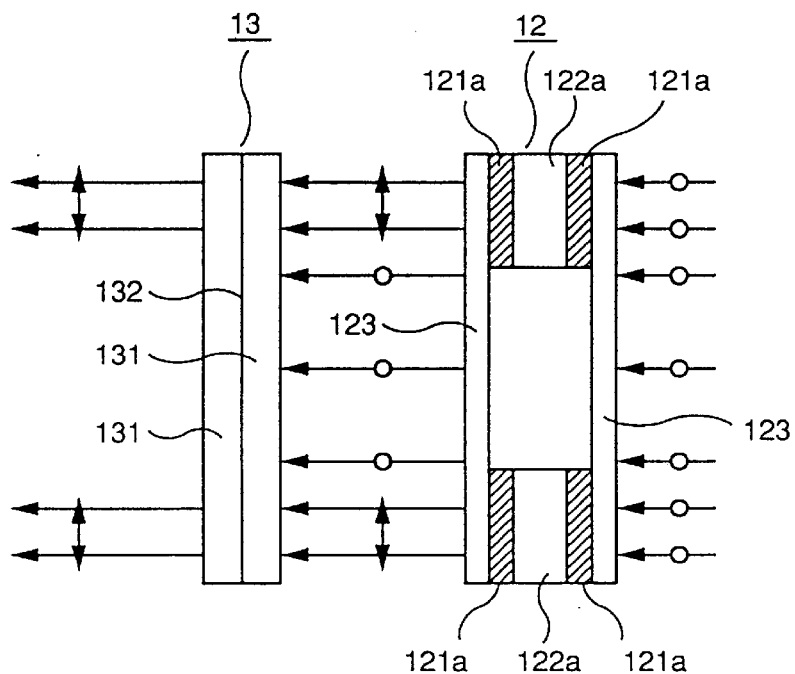

When a laser beam polarizing in a direction perpendicular to the drawing of the sheet as described above is to be used, the diameter of inner portion 121b of the transparent electrode (FIGS. 17A and 17B) or the diameter of the region where TN type liquid crystal 122 is not provided (FIGS. 18A and 18B) is selected so that the beam diameter of the main lobe by optical superresolution becomes 0.7–1.1 μm for an objective lens 15 having a numerical aperture of 0.55 (tolerable error ±0.1) and for the effective luminance flux having a diameter of 4 mm. When the diameter of effective luminance flux diameter is not 4 mm, the diameter of the inner portion is determined in proportion to the effective luminance flux so that the beam diameter of the main lobe is 0.7–1.1 μm.

Although a polarization plane rotary unit 12 and a polarizing filter 13 are used in the above embodiments, a polarization selective hologram, a guest-host element, a glass polarizer, a polarization beam splitter, and the like can be used instead.

Figure 19A:
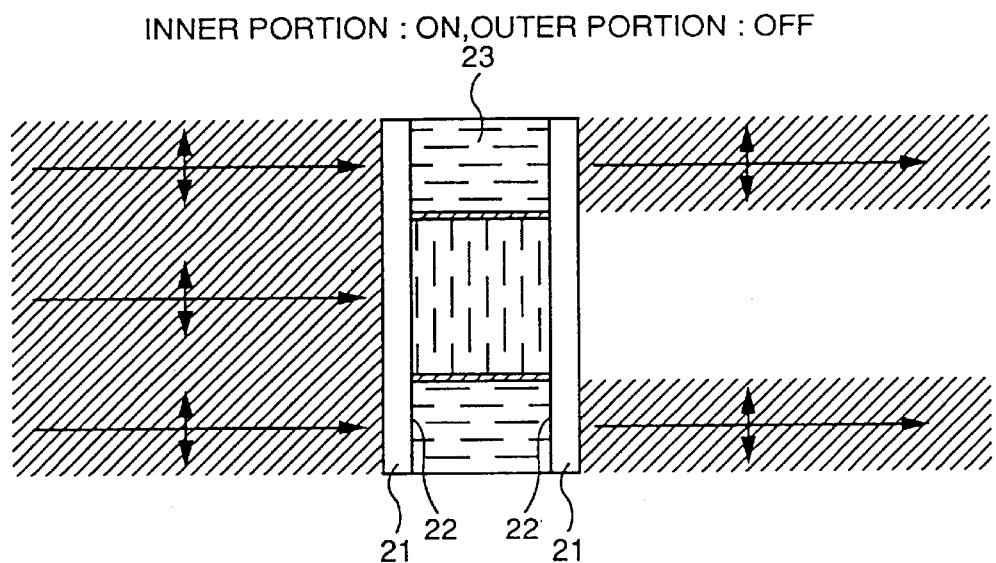
FIGS. 19A and 19B show a structure and driving states of a liquid crystal shutter as an alternative to the polarizing filter of the optical system shown in FIG. 14.
Figure 19B:
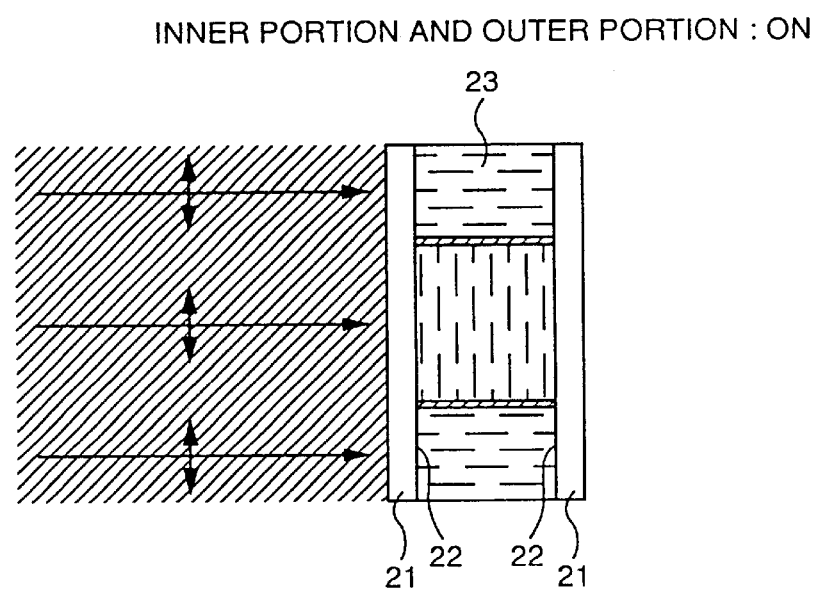

For example, a liquid crystal shutter as shown in FIGS. 19A and 19B can be used instead of polarization plane rotary unit 12 and polarizing filter 13. The liquid crystal shutter includes a pair of transparent glass plates 21, a transparent electrode 22 formed at respective inner surfaces of the pair of glass plates 21, and a guest-host type liquid crystal 23 sandwiched between the pair of glass plates 21. The guest-host type liquid crystal is divided into an outer portion and an inner portion to allow voltages to be applied independently. The guest-host type liquid crystal is an element that exhibits polarizing selective characteristics only when a voltage is applied.

When the voltage applied to the inner portion is turned on and the voltage applied to the outer portion is turned off as shown in FIG. 19A, the laser beam polarizing in a direction perpendicular to the sheet of the drawing has only its outer portion transmitted. When the voltage applied to the inner portion and the outer portion are both turned on as shown in FIG. 19B, the laser beam polarizing in a direction perpendicular to the drawing sheet is entirely blocked by the guest-host type liquid crystal. Thus, a pulsed laser beam formed of a main lobe and a pair of side lobes by optical superresolution can be provided according to such a structure.

Figure 20A:
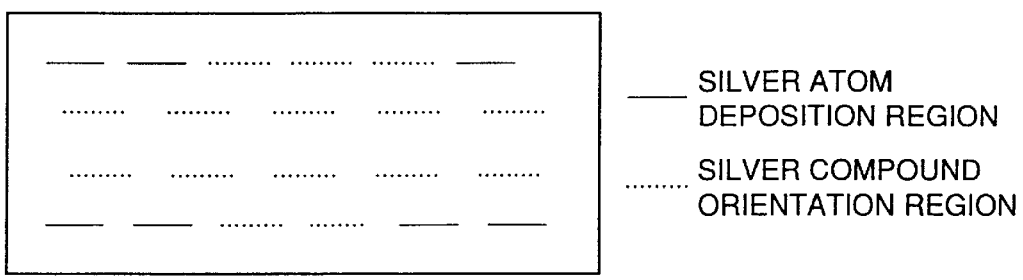
FIGS. 20A and 20B are front views of a glass polarizer as an alternative to the polarizing filter of the optical system shown in FIG. 14.
Figure 20B:
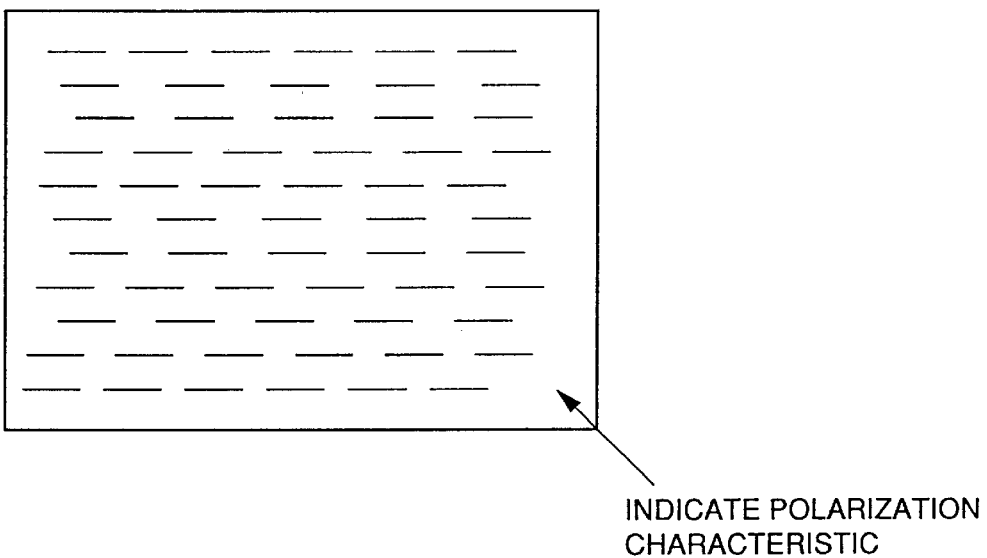

Alternatively, a glass polarizer as shown in FIGS. 20A and 20B can be used instead of polarizing filter 13 in the above embodiment. The glass polarizer is fabricated by arranging silver compound in a predetermined direction in glass, as shown in FIG. 20A, and reducing the surface to deposit silver. The reduced silver film exhibits polarization characteristics. Although it is desirable to use silver as the material for providing polarization characteristics in the glass polarizer, other metal materials can be used as long as it provides polarization characteristics.

Although TN type liquid crystal 122 is used as polarization plane rotary unit 12 in the above embodiment, a STN (Super Twisted Nematic) liquid crystal or a ferroelectric type liquid crystal can be used. When a positive voltage is applied for short time, the ferroelectric type liquid crystal causes the plane of polarization of the laser beam to be rotated 45° and maintains that state. When a negative voltage is applied for a short time period, the ferroelectric type liquid crystal causes the plane of polarization of the laser beam to be rotated 45° in a direction opposite to that of the positive voltage application, and maintains that state. Therefore, there will be a difference of 90° in the direction of polarization of the transmitted laser beam between application of a positive voltage and a negative voltage. Therefore, by rotating the direction of polarization of the incident laser beam 45° in advance than the direction of polarization of the above-described embodiment, the plane of polarization of the laser beam can be rotated 90°, as in the above embodiment. Usage of such a ferroelectric type liquid crystal provides the advantage of reducing power consumption since the voltage is to be applied only for a short time period initially.

Figure 21:
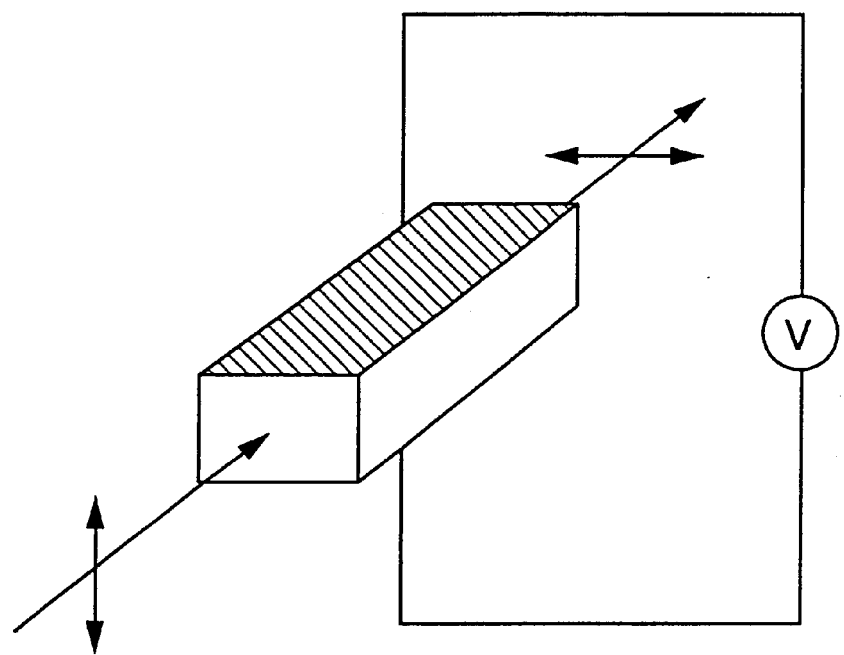
FIG. 21 is a diagram for describing the operation principle of a Pockels cell as an alternative to the TN type liquid crystal of the optical system shown in FIG. 14.

Furthermore, a Pockels cell as shown in FIG. 21 can be used instead of TN type liquid crystal 122 in the above embodiment. When a predetermined voltage is applied, a Pockels cell polarizes the laser beam having a plane of polarization in a vertical direction in the sheet of FIG. 21 into a laser beam having a plane of polarization in the horizontal direction in the same drawing. Since the rotating angle of the plane of polarization can be altered by adjusting the applied voltage, the rotating angle of the plane of polarization can be adjusted so as to obtain the optimum recording and reproduction characteristics.

Figure 22:
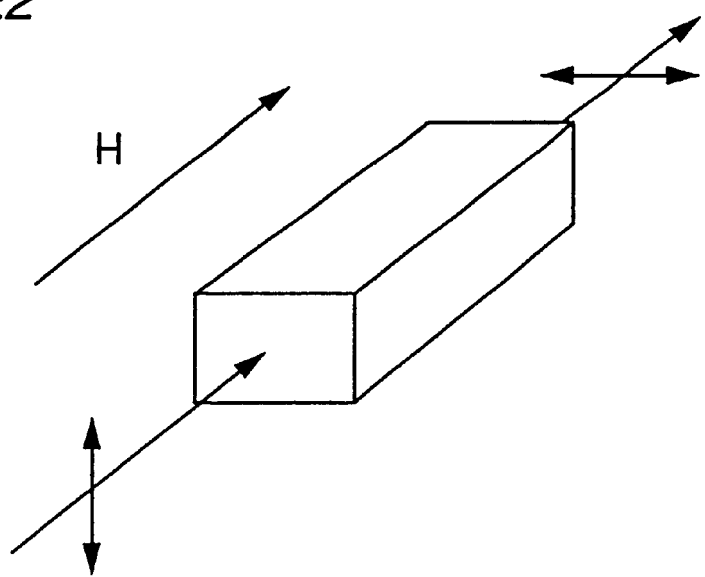
FIG. 22 is a diagram for describing the operation principle of a Faraday cell as an alternative to the TN type liquid crystal of the optical system shown in FIG. 14.

Also, a Faraday element that rotates the plane of polarization magnetically as shown in FIG. 22 can be used instead of TN type liquid crystal 122 in the above embodiment. Since the direction of passage of the laser beam is identical to the direction of applied magnetic field H in a Faraday element, the plane of polarization can be rotated by winding a coil around a tube that supports the Faraday element. Accordingly, assembly and the structure of a Faraday element is simple.

The configuration of the center portion of the laser beam that blocks light does not necessarily have to be circular. The center portion of the laser beam may have a polygonal configuration of any of a triangle to an octagon.

Thus, according to the second embodiment of the present invention, a pulsed laser beam by optical superresolution can be provided only at the time of reproduction using a single optical system to reproduce information at high density from a magnetically induced superresolution magneto-optical disk.

An information recording and reproduction apparatus according to a third embodiment of the present invention will be described hereinafter with reference to FIG. 23. The information recording and reproduction apparatus of the third embodiment has a structure similar to that of the information recording and reproduction apparatus of the first embodiment shown in FIG. 5. The information recording and reproduction apparatus of the third embodiment is characteristic in its optical head 36. Therefore, only the optical head of the information recording and reproduction apparatus of the third embodiment will be described.

Figure 23:
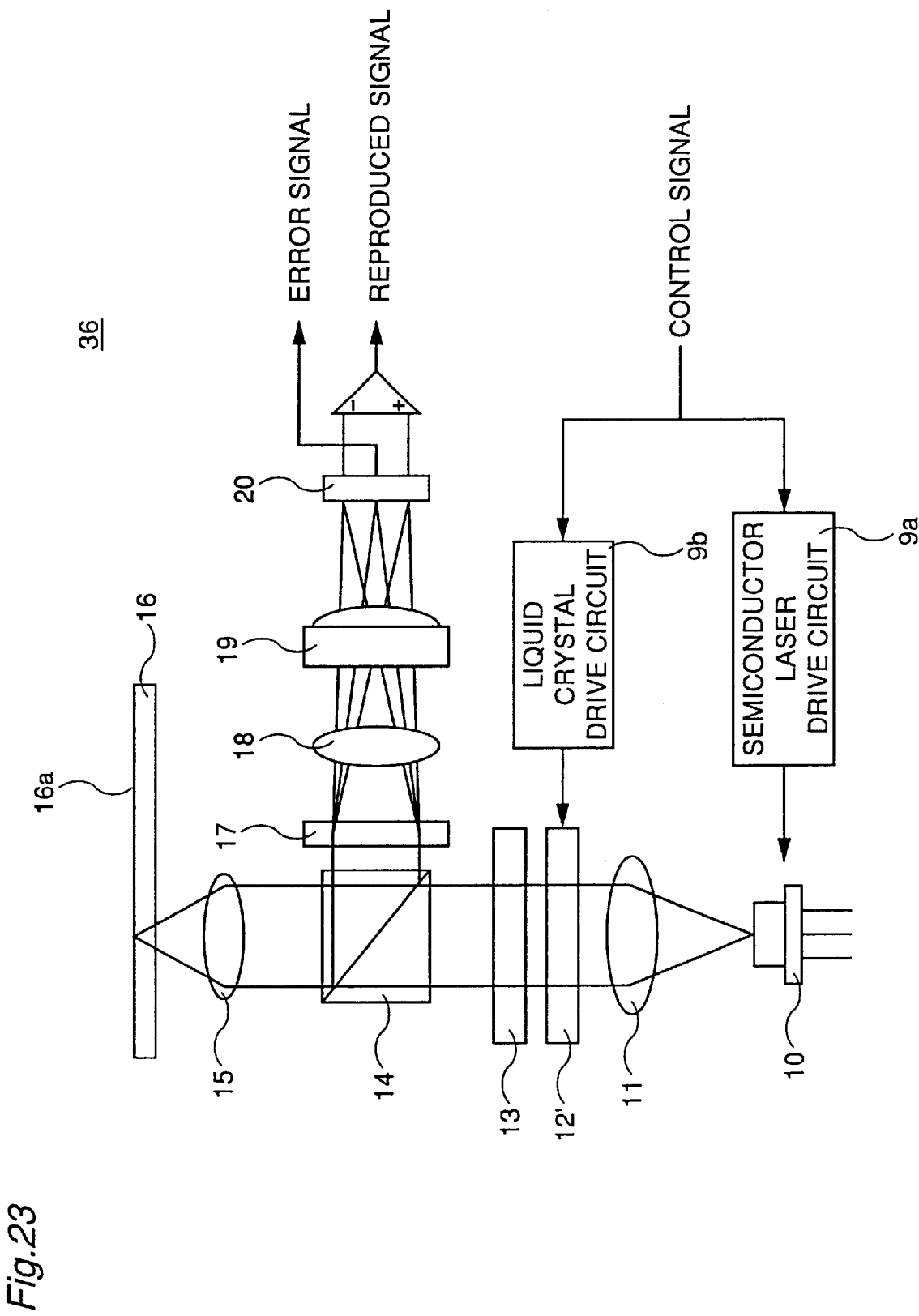
FIG. 23 is a block diagram showing a structure of an optical system used in an information recording and reproduction apparatus according to a third embodiment of the present invention.

The structure of the optical head of FIG. 23 is similar to the optical head of the second embodiment shown in FIG. 14 except for the structure of polarization plane rotary unit 12'. Therefore, description of common elements will not be repeated.

In contrast to the optical head of the second embodiment shown in FIG. 14 in which the laser beam has the inner portion blocked and formed by optical superresolution to provide a pulsed laser beam, the third embodiment shown in FIG. 23 provides a pulsed laser beam without using the optical superresolution method.

In optical head 36 of FIG. 23, a laser beam having a wavelength of 680 nm (tolerable error ±15 nm) generated from a semiconductor laser 10 is made parallel by a collimator lens 11 to enter an objective lens 15 through a polarization plane rotary unit 12', or polarizing filter 13, and a half mirror 14. The laser beam is focused by objective lens 15 to be emitted on recording plane 16a through a substrate of disk 16 which is a magneto-optical recording medium.

The laser beam reflected at recording plane 16a returns to half mirror 14 via substrate 16 and objective lens 15. Half of the laser beam passes through half mirror 14 and the remaining half is reflected thereat. The laser beam reflected from half mirror 14 passes through Wollaston prism 17, collection lens 18, and cylindrical lens 19 to be converged to enter photodetector 20. A reproduction signal and error signals are detected by photodetector 20. In the third embodiment of the present invention, the wavelength of the laser beam is 400–800 nm, preferably 600–700 nm, and further preferably 620–650 or 665–695 nm.

Figure 24A:
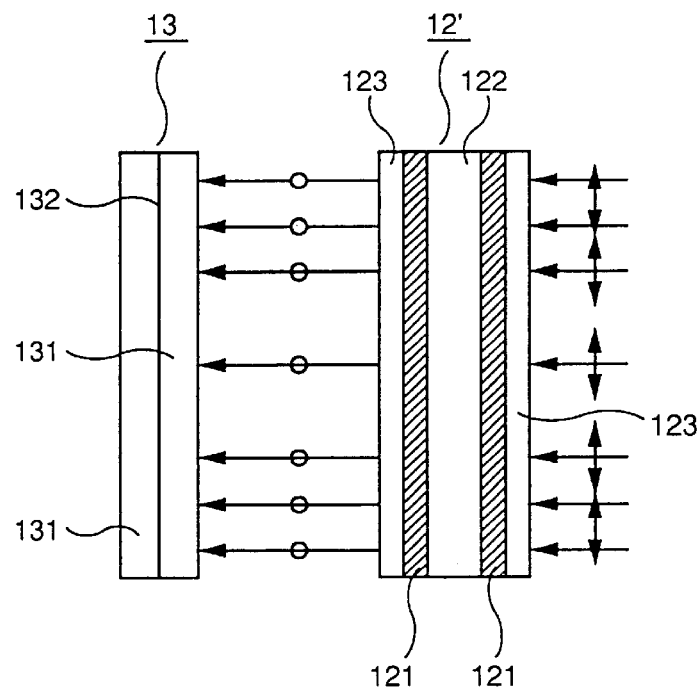
FIGS. 24A and 24B show a structure and driving states of the polarizing filter and the polarization plane rotary unit of the optical system shown in FIG. 22.
Figure 24B:
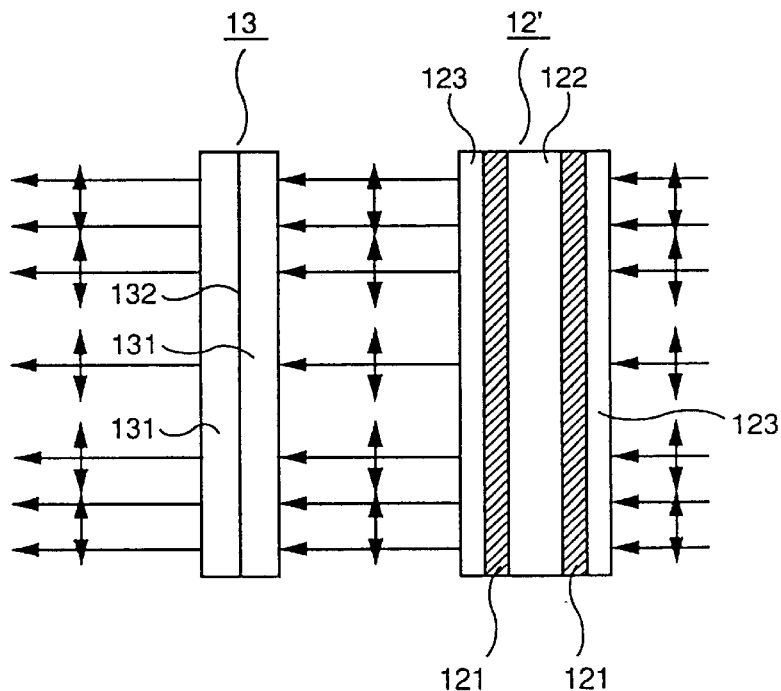

Polarizing filter 13 has a structure identical to that of the second embodiment. As shown in FIGS. 24A and 24B, polarizing filter 13 includes a pair of transparent glass plates 131, and a polarizing film 132 sandwiched by the pair of glass plates 131. Polarizing film 132 has the property of transmitting only a laser beam that is polarized in a particular direction. Any material that is transparent and has superior optical characteristics can be used for transparent glass 131. For example, resin (polycarbonate PMMA, and the like) can be used.

The polarizing characteristics of polarizing filter 13 is as shown in FIG. 16, similar to that of the second embodiment. More specifically, polarizing filter 13 transmits only a laser beam that polarizes in a particular direction by means of polarizing film 132. In the present third embodiment, it is assumed that a laser beam having a plane of polarization parallel to the drawing sheet is transmitted.

Polarization plane rotary unit 12' includes a pair of transparent glass plates 123, a pair of transparent electrodes 121 formed on the respective inside surfaces of glass plates 123, and a TN type liquid crystal 122 sandwiched between the pair of transparent electrodes 121.

A recording operation of the optical head of the third embodiment will be described hereinafter. In recording, a voltage is applied entirely to transparent electrode 121 of polarization plane rotary unit 12' as shown in FIG. 24B. The laser beam entering TN type liquid crystal 122 polarizing in a direction parallel to the drawing sheet is passed through without having its plane of polarization entirely rotated. Then, the laser beam enters polarizing film 132 of polarizing filter 13. Since polarizing film 132 transmits only a laser beam that is polarized in a direction parallel to the drawing sheet, the incident laser beam passes through polarizing filter 13 without being entirely blocked to be emitted on recording plane 16a of the magneto-optical disk via half mirror Ki and objective lens 15. Recording onto a magneto optical disk is carried out by a pulsed magnetic field and a pulsed laser beam, as in the second embodiment. The pulsed magnetic field has a duty of 50%, and the pulsed laser has a duty of 30%.

A reproduction operation of the optical head of the third embodiment will be described hereinafter. In reproduction, the voltage applied to transparent electrode 121 of polarization plane rotary unit 12' is turned on/off in synchronization with the first synchronizing signal generated from first synchronizing signal generation circuit 44 of the information recording and reproduction apparatus shown in FIG. 5 or 9. As a result, the incident laser beam polarized in a direction parallel to the drawing sheet passes through TN liquid crystal 122 without having its plane of polarization.entirely rotated to enter polarizing filter 13 when the voltage applied to transparent electrode 121 is turned on. Since polarizing film 132 in polarizing filter 13 passes through only the laser beam that is polarized in a direction parallel to the drawing sheet as described above, the laser beam is transmitted entirely through polarizing filter 13.

When the voltage applied to transparent electrode 121 is turned off, the laser beam that is polarized in a direction parallel to the drawing sheet has its plane of polarization entirely rotated 90° by TN type liquid crystal 122 so as to polarize in a direction perpendicular to the drawing sheet. As a result, the incident laser beam in polarizing filter 13 is entirely blocked by polarizing film 132. Therefore, a pulsed laser beam can be provided for reproduction by turning on/off the voltage applied to transparent electrode 121.

Although polarizing filter 13 is used in the third embodiment, a polarizing selective hologram, a guest-host element, a glass polarizer, a polarization beam splitter and the like can be used instead, as in the case of the second embodiment.

In the third embodiment, TN type liquid crystal 122 is used as polarization plane rotary unit 12'. The present invention is not limited to this, and a STN type liquid crystal, a ferroelectric type liquid crystal, and the like can be used instead, as in the second embodiment. Also, the plane of polarization can be rotated electrically, not by a liquid crystal, but by using a Pockels cell. Furthermore, a Faraday element can be used to rotate the plane of polarization magnetically.

In the second and third embodiments, a pulsed laser beam for reproduction is provided by repeating blocking/transmission of the laser beam in synchronization with a pulse signal generated by duty correction circuit 45 shown in FIG. 5 or 9. A pulsed laser beam can be obtained, not only by this method, but by turning on/off semiconductor laser 10 per se in optical head 36 in synchronization with a pulse signal generated by duty correction circuit 45 of FIG. 5 and 9.

Furthermore, the method of repeating blocking/transmission of a laser beam is not limited to the method described in the second and third embodiments in which a combination of a polarization plane rotary unit and a polarizing filter is used. The laser beam can repeatedly be blocked/transmitted by inserting and withdrawing a light blocking body into and from an optical path by mechanical means.

According to the second and third embodiments, information can be reduced from a record domain having the shortest length of 0.15–0.30 µm.

Figure 25:
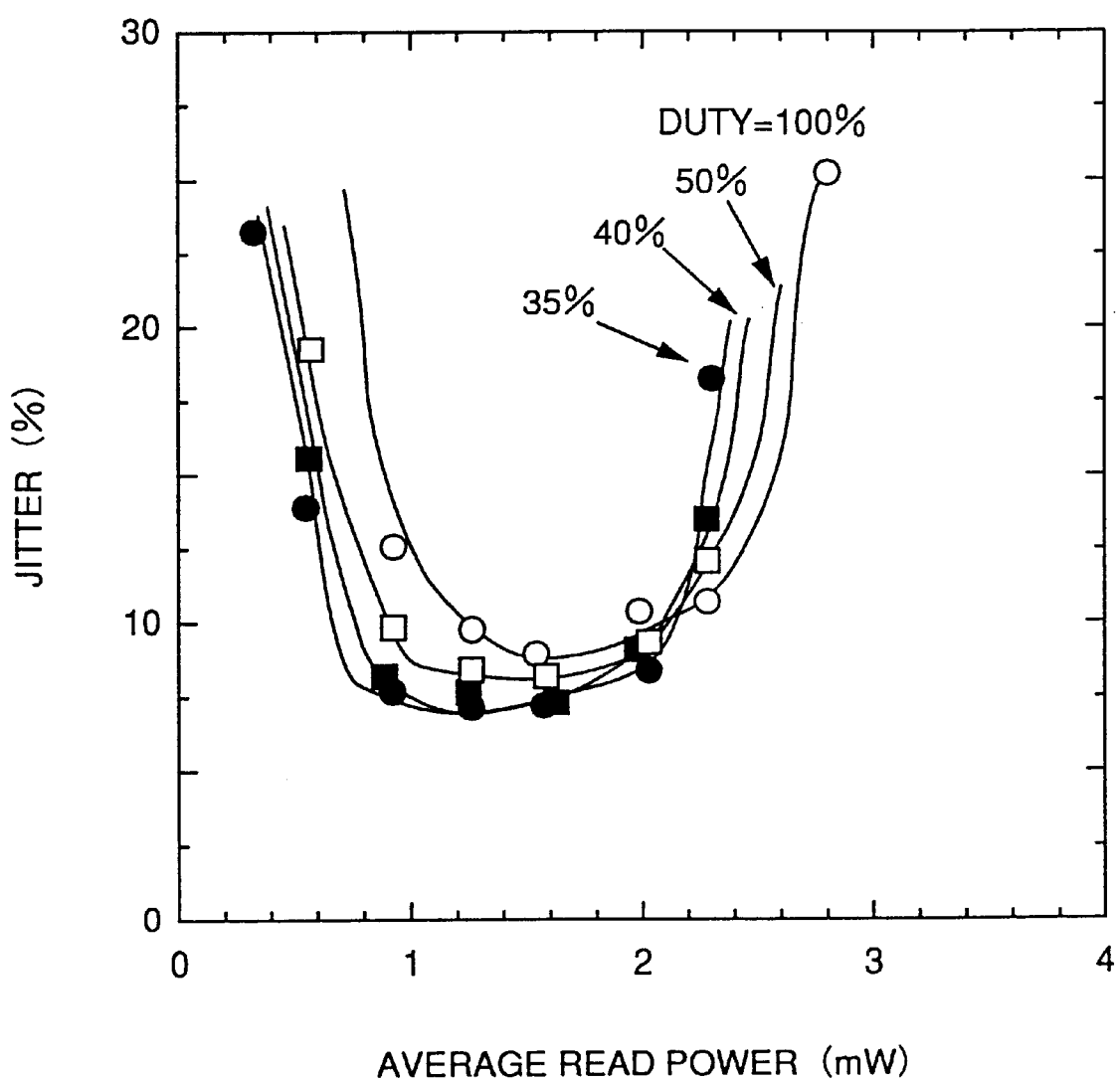
FIG. 25 is a diagram showing the relationship between a laser beam for reproduction and jitter at the time of reproduction according to the second and third embodiments of the present invention.

FIG. 25 shows the relationship of jitter over laser power at the time of reproduction according to the second and third embodiments.

In FIG. 25, the duty values of a pulsed laser beam of 35%, 40%, 50% and 100% is employed as parameter. It is appreciated from the graph of FIG. 25 that a range of 1.02–2.5 mW is appropriate for the laser power at the time of reproduction. It is also appreciated that the jitter in reproduction using a pulsed laser beam is smaller than the case using a continuously emitted light of 100% in duty. It is understood that the time period of a laser beam emission becomes shorter as the duty which indicates the degree of a pulsed laser beam becomes smaller to result in a smaller jitter during reproduction. Thus, favorable reproduction characteristics can be exhibited as the degree of the pulsed laser beam is increased. In the above-described embodiments, the reproduction resolution is improved by inserting the light blocking body into the direction of the track of the disk to improve the line density without being affected by side lobes when the optical superresolution method is employed. The track density can also be improved without being affected by side lobes by inserting the light blocking body into the tangential direction at the time of recording. By setting a different direction for the light blocking body to be inserted between recording and reproduction, the recording density can further be improved.

A fourth embodiment of the present invention relates to an information recording and reproduction apparatus of a recording medium in which a wobble is provided at the wall of a groove of a recording medium.

Figure 26:
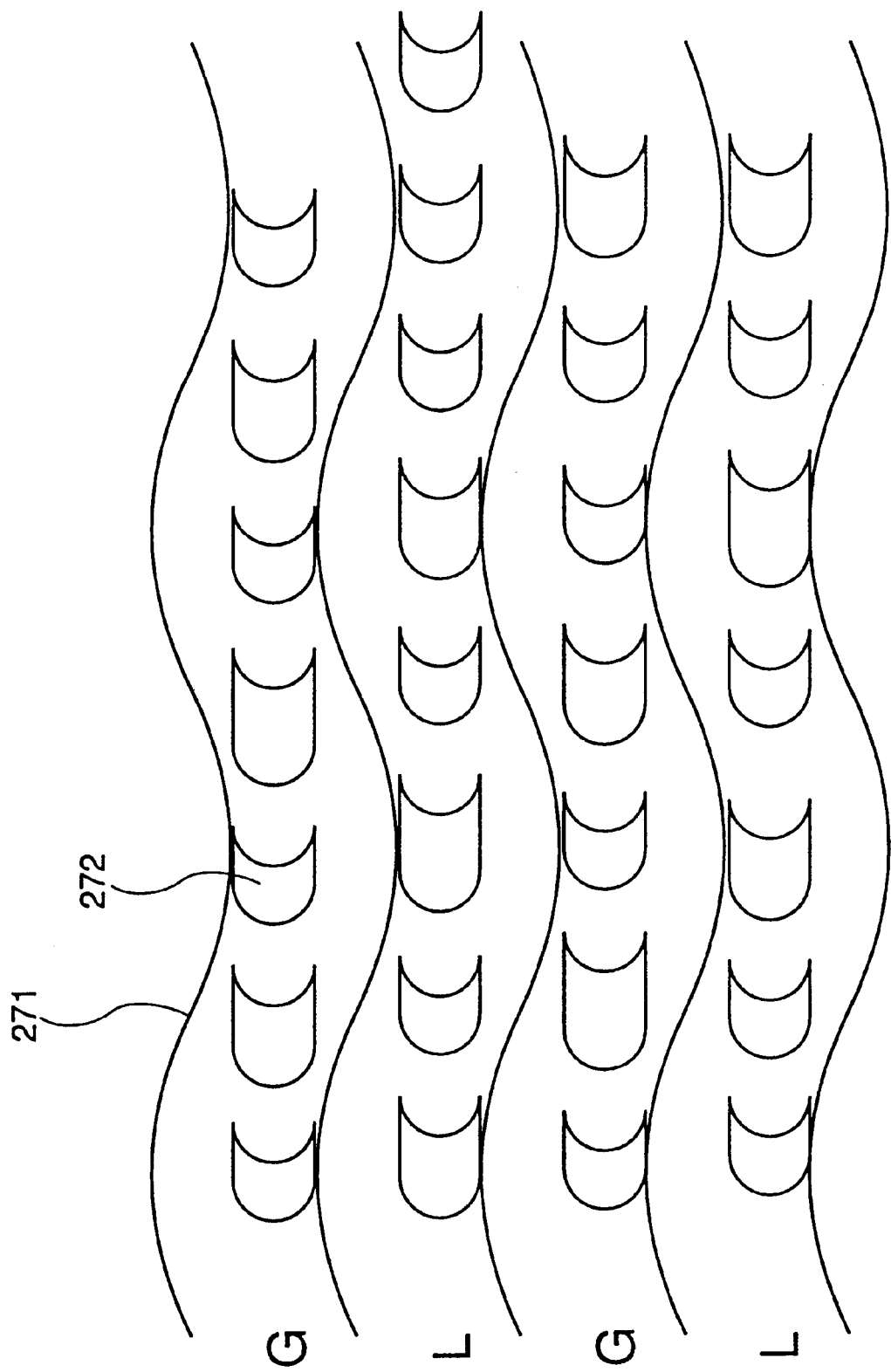
FIG. 26 is a schematic diagram showing an example of a plane configuration of a wobble formed on a surface of an information recording medium.

A recording medium such as a conventional magneto optical disk is known to have a guide groove formed at the surface for tracking. Formation of a wobble at a relatively long predetermined cycle on at least one sidewall of the guide groove has been proposed. The wobble is implemented by forming guide groove so that the plane configuration of at least one sidewall of the guide groove has a gentle sine waveform modulated by an address information signal, a synchronizing signal, and the like. FIG. 26 is a schematic diagram showing an example of the plane configuration of such a wobble. In this example, a wobble is provided at both sidewalls of a groove. Referring to FIG. 26, domains 272 each having a length corresponding to each record signal is formed in the groove or land. where wobble 271 is formed. Recording onto the groove or land is effected by applying a pulsed magnetic field and a pulsed laser beam as described in the first embodiment. The predetermined cycle of a wobble is in the range of 0.8–35 µm.

Figure 27:
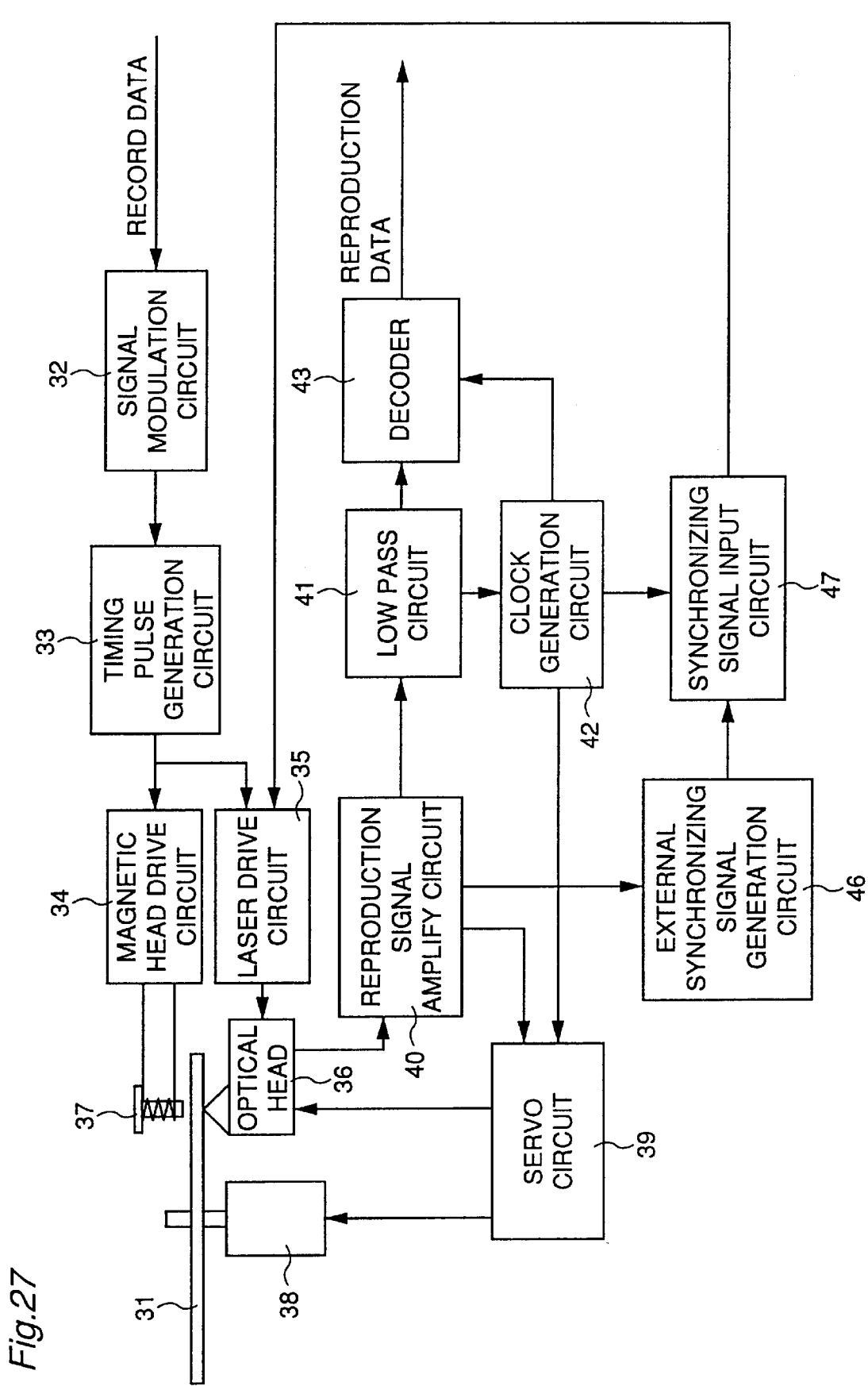
FIG. 27 is a block diagram showing an entire structure of an information recording and reproduction apparatus according to a fourth embodiment of the present invention.

FIG. 27 is a block diagram showing an entire structure of an information recording and reproduction apparatus according to the fourth embodiment of the present invention. This apparatus is suitable to reproduce information from a recording medium in which a wobble is formed as shown in FIG. 26. The information recording and reproduction apparatus of FIG. 27 is similar to the information recording and reproduction apparatus of the first embodiment shown in FIG. 5 except for the elements described in the following. Description of common elements will not be repeated.

Specifically, the information recording and reproduction apparatus of the fourth embodiment includes an external synchronizing signal,generation circuit 46 to receive a wobble signal output from a reproduction signal amplify circuit 40 for generating an external synchronizing signal, and a synchronizing signal input circuit 47 to receive the external synchronizing signal and an internal clock from clock generation circuit 42 for generating synchronizing signal, instead of first synchronizing signal generation circuit 44 and duty correction circuit 45 of the first embodiment shown in FIG. 5. The output of synchronizing signal input circuit 47 is provided to laser drive circuit 35.

Figure 28:
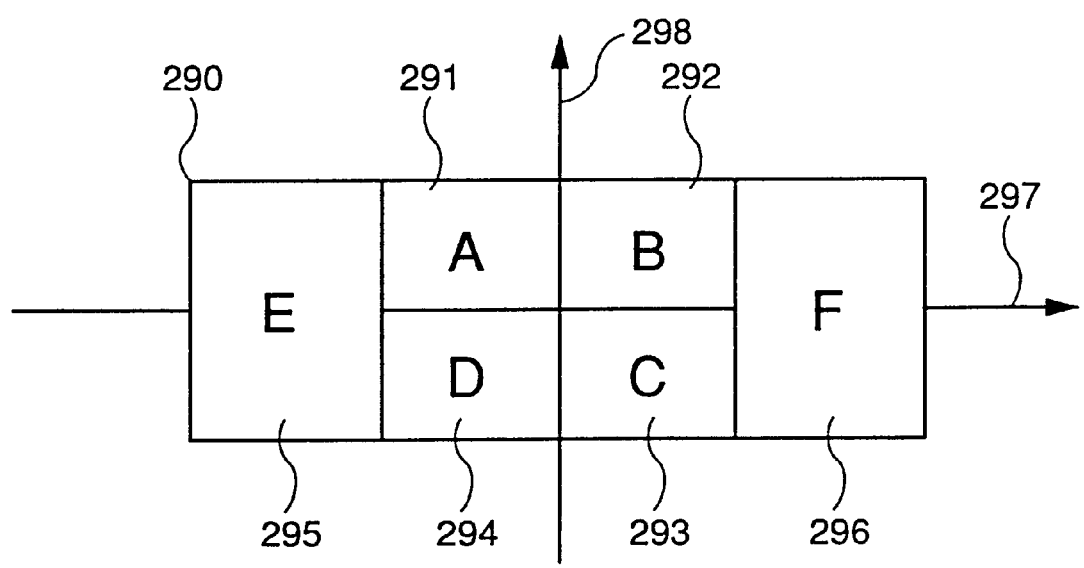
FIG. 28 is a schematic diagram showing a signal detection principle in the optical head shown in FIG. 27.

FIG. 28 is a schematic diagram for describing the principle of detecting a reproduction signal, a wobble signal, and error signals by the photodetector in optical head 36 of FIG. 27. Referring to FIG. 28, a photodetector 290 is divided into six regions, A, B, C, D, E and F. Photodetector 290 is arranged as shown in FIG. 28 with respect to the tracking direction shown by arrow 297 and the track direction shown by arrow 298.

As previously described with reference to FIGS. 14 and 23, reflected light of the laser beam from the signal recording plane passes through a Wollaston prism to be divided into three beams. Among these three beams, the beams at both sides are detected by regions E295 and F296, respectively, to be detected as a reproduction signal [DE−DF] which is the difference between the intensities DE and DF of the detected laser beams.

The middle beam out of the three beams is detected by regions A291, B292, C293 and D294 to have [DA+DB]−[DC+DD] detected as a superimposed signal of a wobble signal and a tracking error signal, and [DA+DC]+[DB+DD] detected as a focus error signal, which are calculated from the intensities DA, DB, DC, and DD of the laser beam detected at respective regions.

Figure 29A:
FIGS. 29A–29D are timing charts for describing an operation of the external synchronizing signal generation circuit of FIG. 27.

FIG. 29A shows the waveform of the above-mentioned signal which is a superimposition of a wobble signal and a tracking error signal. The signal of FIG. 29A detected by photodetector 290 of optical head 36 is divided into a wobble signal of high frequency and a tracking error signal of low frequency by reproduction signal amplify circuit 40. The wobble signal is applied to external synchronizing signal generation circuit 46, and the tracking error signal is applied to servo circuit 39.

Referring to FIG. 27 again, the above-described reproduction signal [DE−DF] obtained from optical head 36 is amplified by reproduction signal amplify circuit 40 to be provided to low pass circuit 41. Low pass circuit 41 integrates the applied signal to provide the integrated signal to decoder 43 and clock generation circuit 42. The clock component is extracted from the reproduction signal by clock generation circuit 42 to be applied to servo circuit 39, synchronizing signal input circuit 47, and decoder 43.

The reproduction signal integrated by low pass circuit 41 is demodulated by the 1-7 method in synchronization with the clock signal from clock circuit 42 by decoder 43 to be output as reproduced data. Servo circuit 39 rotates spindle motor 38 at a predetermined speed of rotation and controls objective lens 15 in optical head 36 to carry out control of the tracking servo and the focus servo according to the tracking error signal and the focus error signal from reproduction signal amplify circuit 40 and the clock signal from clock generation circuit 42.

Figure 29B:
Figure 29C:
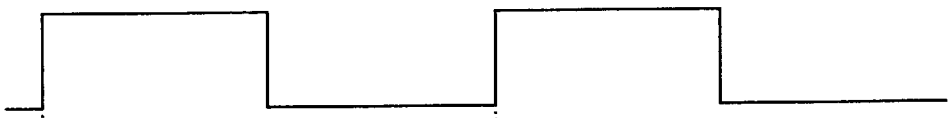
Figure 29D:

The operation of external synchronizing signal generation circuit 46 will be described with reference to FIGS. 29A–29D. A wobble signal of high frequency separated from the waveform of FIG. 29A by reproduction signal amplify circuit 40 is applied to external synchronizing signal generation circuit 46. FIG. 29B shows this wobble signal enlarged in the direction of the time axis. External synchronizing signal generation circuit 46 binarizes this wobble signal as shown in FIG. 29C to generate a synchronizing signal that is in synchronization with the rising timing of this binarized signal (FIG. 29D). More specifically, external synchronizing signal generation circuit 46 functions to generate a synchronizing signal in synchronization with the wobble which is a reference signal provided at the sidewall of the groove shown in FIG. 26, i.e. an external synchronizing signal. The generated external synchronizing signal is applied to the next-stage synchronizing signal input circuit 47.

The specific structure of external synchronizing signal generation circuit 46 will be described with reference to FIG. 30. The wobble signal (FIG. 29B) from reproduction signal amplify circuit 40 is binarized by a comparator 461. Since a wobble signal is generally a signal modulated by a predetermined reference information signal, the binarized wobble signal is demodulated by demodulator 462. The demodulated binarization wobble signal (FIG. 29C) and a predetermined reference pulse signal from a frequency divider 466 are applied to a phase comparator 463. Phase comparator 463 generates a plus error signal and a minus error signal when the phase of the predetermined reference pulse signal is ahead and behind, respectively, to provide a phase error signal formed of this plus error signal or minus error signal to a low pass filter (LPF) 464. LPF 464 averages for a predetermined time the plus or minus error signal provided from phase comparator 463 to apply a resultant plus or minus voltage signal to a voltage control oscillation circuit (VCO) 465. VCO 465 responds to the plus or minus voltage value from LPF 464 to generate and provide to frequency divider 466 a frequency signal for altering the phase of the predetermined reference pulse signal. Frequency divider 466 alters the phase of the predetermined reference pulse signal according to the frequency from VCO 465. The predetermined reference pulse signal having its phase altered is applied to one input of phase comparator 463.

Also, the output of VCO 465. is applied to synchronizing signal input circuit 47 as an external synchronizing signal (FIG. 29D).

Figure 30:
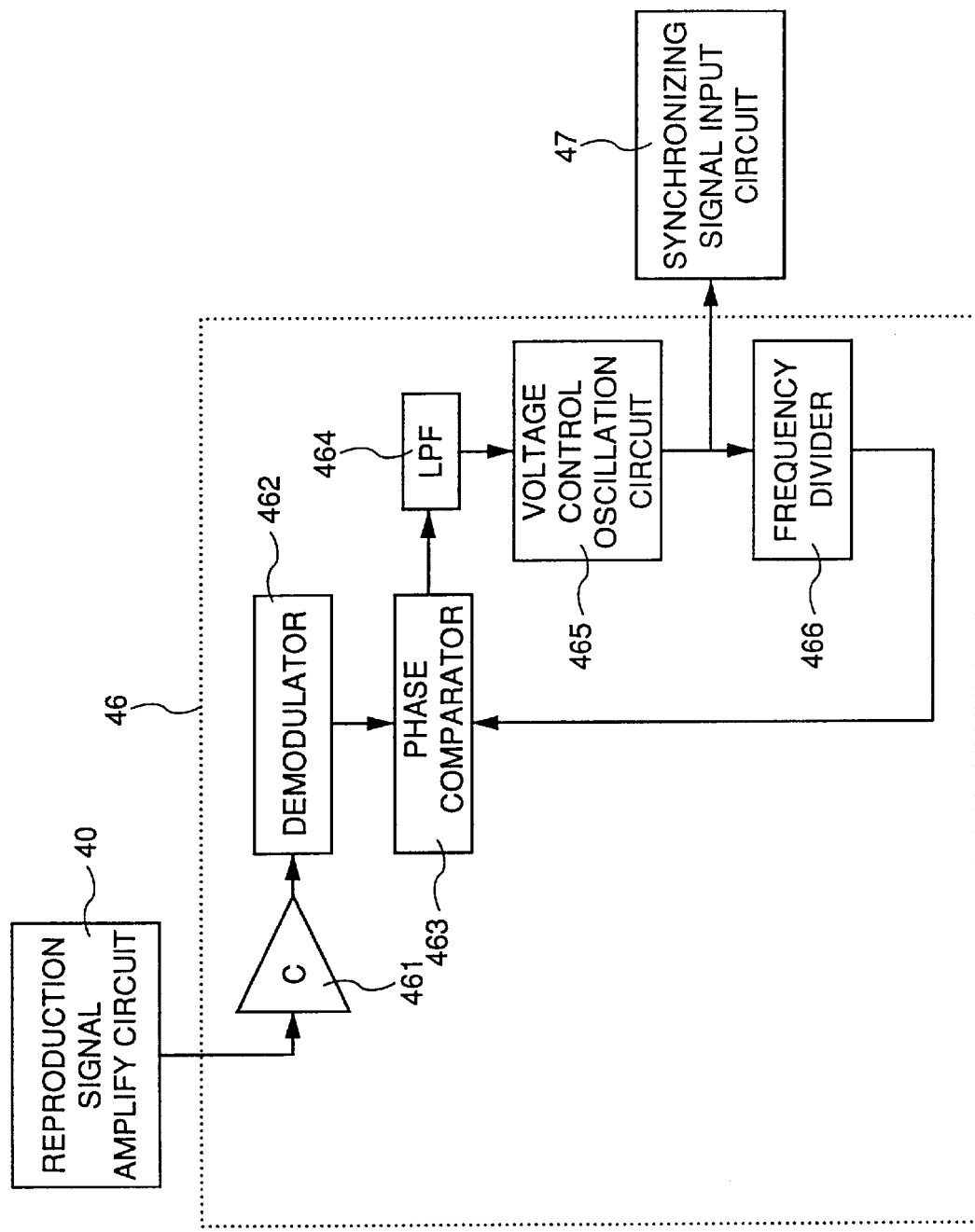
FIG. 30 is a block diagram specifically showing the external synchronizing signal generation circuit of FIG. 27.

FIGS. 31A–31F are timing charts for describing in detail the operation of the external synchronizing signal generation circuit shown in FIG. 30. Reproduction signal amplify circuit 40 applies the wobble signal shown in FIG. 31A to the input of comparator 461. FIG. 31B shows this wobble signal partially enlarged in the direction of the time axis. Comparator 461 generates a binarized version of th is wobble signal (FIG. 31C). The binarized signal is applied to demodulator 462 to be subjected to a demodulation process required for a wobble signal. The demodulated binarized wobble signal is applied to an input of phase comparator 463. Since this binarized wobble signal has its phase fluctuated as shown in FIG. 31C, it can not be directly used as a reference signal for generating proper synchronizing signal. Phase comparator 463 is provided for the purpose of removing the fluctuation in the phase of this wobble signal to be set as the correct reference of synchronizing signal generation. Phase comparator 463 compares the phases of this wobble signal and a reference pulse signal (FIG. 31D).

Phase comparator 463 generates a pulse error signal and a minus error signal when the phase of the predetermined reference pulse signal is ahead and behind, respectively, of the binarized wobble signal. The generated signal is provided to LPF 464 as a phase error signal shown in FIG. 31E.

LPF 464 averages the applied phase error signal within a predetermined time to identify whether the phase error signal is eventually a plus value or a minus value. A phase error signal taking a plus value indicates that the phase of the predetermined reference pulse signal is ahead of the binarized wobble signal. A minus value indicates that the phase of the predetermined reference pulse signal is behind the binarized wobble signal. LPF 464 provides this resultant voltage signal to VCO 465. VCO 465 generates a signal of a frequency to delay or advance the phase of the predetermined reference pulse signal according to the applied plus or minus voltage signal. Frequency divider 466 delays or advances the phase of the predetermined reference pulse signal according to the signal frequency from VCO 465 to provide the altered reference signal to one input of phase comparator 463. This operation is carried out until the phase of the binarized wobble signal matches that of the predetermined reference pulse signal. A predetermined reference pulse signal obtained when the phases of both signals match is shown in FIG. 31F. After the phases are made to match each other, the reference pulse signal from VCO 465 is output as an external synchronizing signal, and also applied to synchronizing signal input circuit 47 of the subsequent stage.

The demodulation operation by demodulator 462 is not necessary when the wobble at the sidewall of the groove is provided simply at a constant cycle, and not demodulated by a predetermined reference information signal.

Referring to FIG. 27 again, synchronizing signal input circuit 47 receives the above-described external synchronizing signal generated by external synchronizing signal generation circuit 46 and an internal clock in synchronization with the reproduction signal, generated by clock generation circuit 42.

The operation of synchronizing signal input circuit 47 will be described with reference to FIGS. 32A–32C. FIG. 32A shows an external synchronizing signal generated by external synchronizing signal generation circuit 46, which corresponds to FIG. 31D. FIG. 32B shows an internal clock separated from a reproduction signal by clock generation circuit 42. Since the phase of external synchronizing signal 310 shown in FIG. 32A is generally deviated from the phase of internal clock signal 311 shown in FIG. 32B, synchronizing signal input circuit 47 carries out correction so that the phase of external synchronizing signal 310 matches that of internal clock signal 311 to generate a synchronizing signal 312 (FIG. 32C) for emitting a pulsed laser beam to a magneto-optical disk in synchronization with a reproduction signal.

The reason why an external synchronizing signal of the present embodiment is required will be described hereinafter with reference to FIGS. 33A–33C. Essentially, a synchronizing signal for emitting a laser beam must be generated in synchronization with an internal clock as in the first embodiment of FIG. 5 for the purpose of providing emission of a pulsed laser beam in synchronization with a reproduction signal. However, when there is a missing portion in the reproduction signal from the recording medium as shown in FIG. 33B, internal clock 313 will also include a missing portion to bar generation of a synchronizing signal required to provide a pulsed laser beam for reproduction.

In the fourth embodiment, an external synchronizing signal is generated according to a wobble that is previously formed on a medium to have the phase of that external synchronizing signal match the phase of the internal clock. Therefore, a synchronizing signal 321 for providing a pulsed laser beam can reliably be generated even if the internal clock itself is missing (FIG. 33C). It is generally possible to generate a synchronizing signal in synchronization with a reproduction signal by using a PLL circuit when a reproduction signal is partially missing. However, a synchronizing signal cannot be generated with a conventional PLL circuit if a great amount of data such as that corresponding to one track is missing. The fourth embodiment is particularly effective in such a case by generating a synchronizing signal for providing a pulsed laser beam according to an external synchronizing signal generated based on the wobble of the recording medium.

Referring to FIG. 27 again, a synchronizing signal for providing a pulsed laser beam is applied to laser drive circuit 35 from synchronizing signal input circuit 47. Laser drive circuit 35 provides control of optical head 36 according to the applied synchronizing signal to provide a pulsed laser beam for reproduction.

Figure 34:
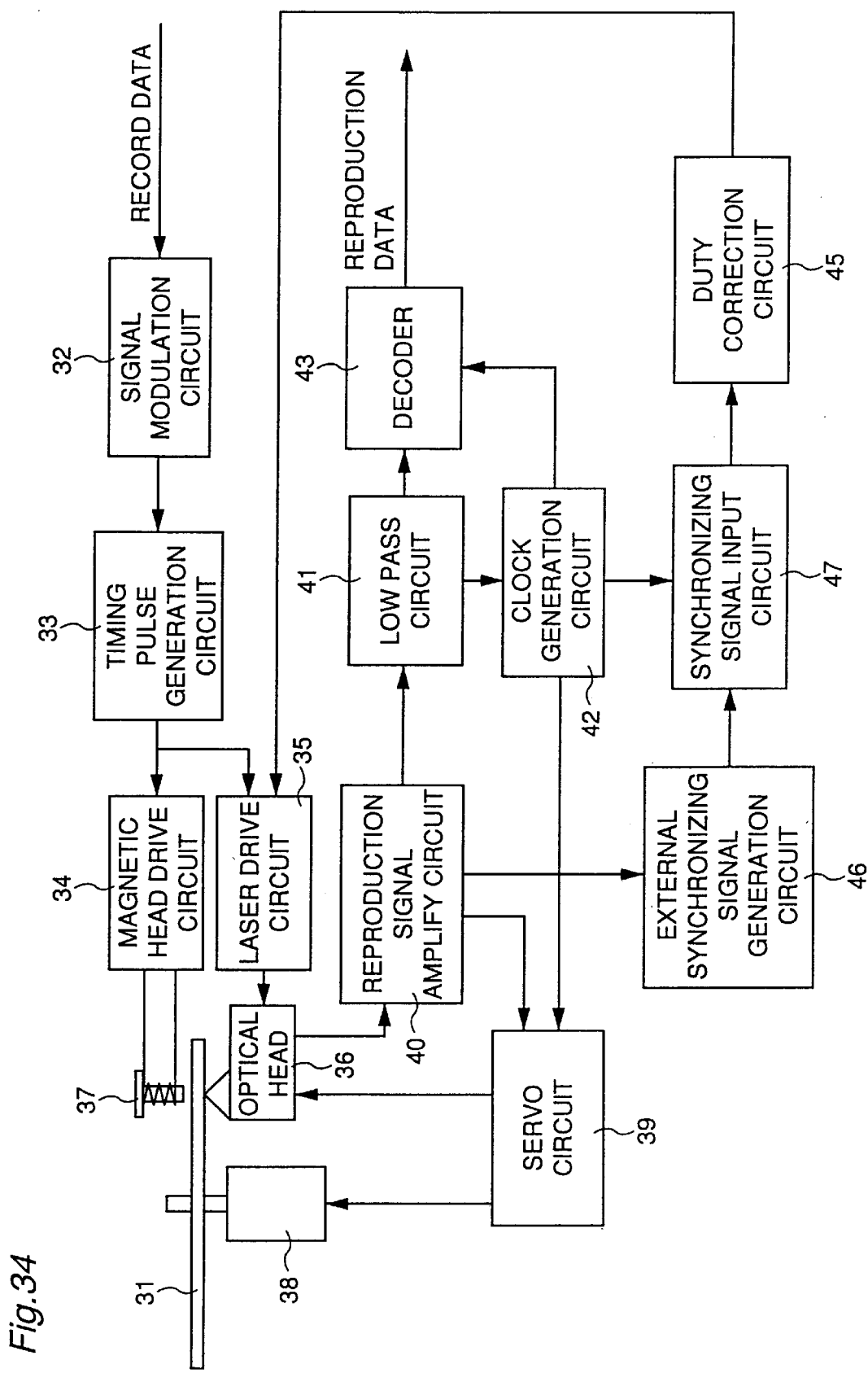
FIGS. 34, 35 and 36 are block diagrams showing a first modification, a second modification, and a third modification, respectively, of the fourth embodiment shown in FIG. 27.

A first modification of the fourth embodiment of the present invention will be described with reference to FIG. 34. The modification of FIG. 34 is similar to the fourth embodiment shown in FIG. 27 except for the following points. Description of common elements will not be repeated. In the first modification of FIG. 34, a duty correction circuit 45 is inserted between synchronizing signal input circuit 47 and laser drive circuit 35. Duty correction circuit 45 receives the synchronizing signal that is required to provide a pulsed laser beam, generated at synchronizing signal input circuit 47. Duty correction circuit 45 generates a pulse signal of a predetermined duty, which is provided to laser drive circuit 35. Laser drive circuit 35 controls optical head 36 to provide a pulsed laser beam for reproduction according to the applied pulse signal.

Figure 35:
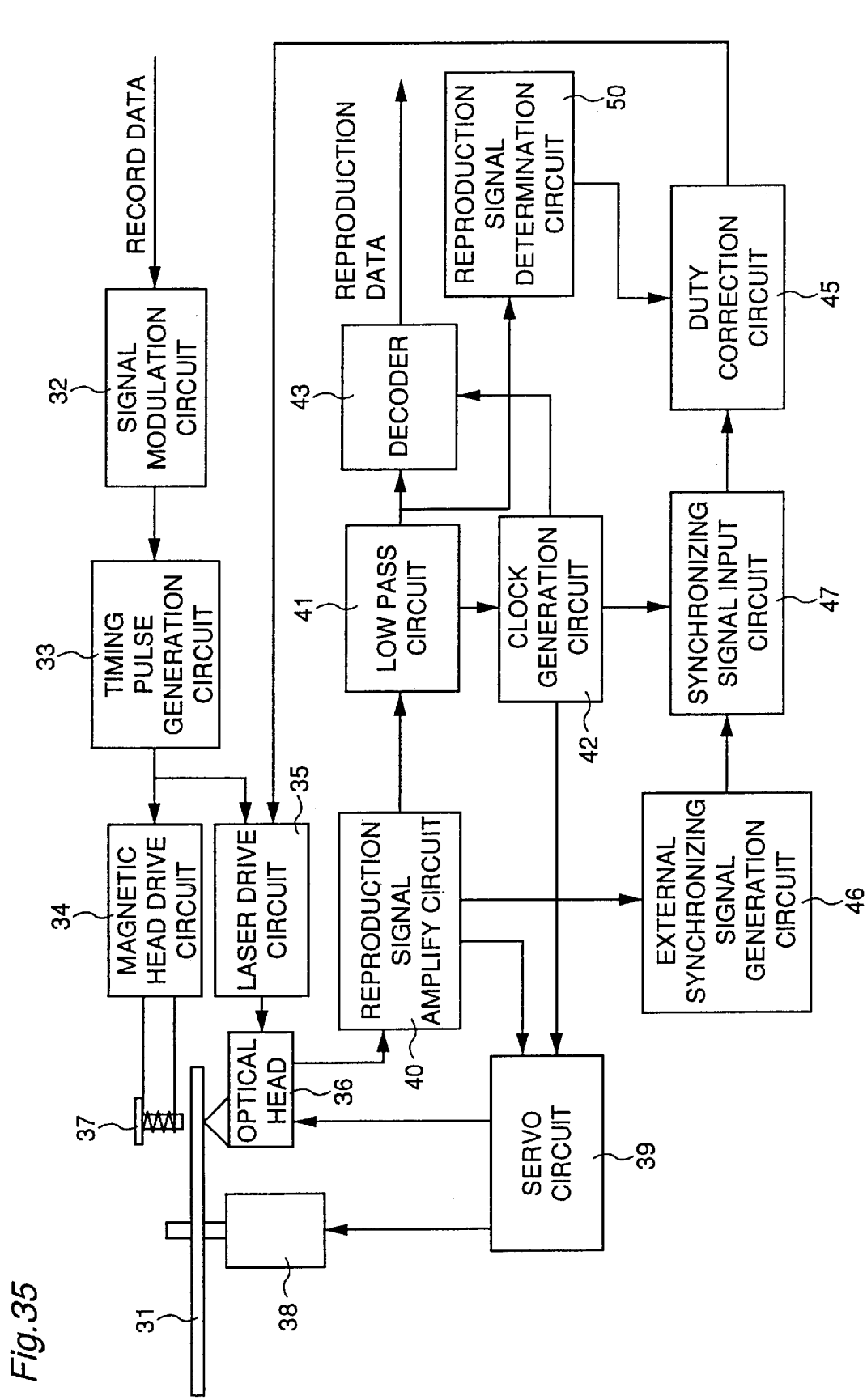

A second modification of the fourth embodiment of the present invention will be described with reference to FIG. 35. The second modification of FIG. 35 is similar to the first modification of FIG. 34 except for the following points. Description of common elements will not be repeated.

Referring to FIG. 35, a reproduction signal determination circuit 50 is provided to determine the amplitude of a reproduction signal from low pass circuit 41 to provide the determined result to duty correction circuit 45. The operation of reproduction signal determination circuit 50 will be described hereinafter.

Reproduction signal determination circuit 50 determines whether the peak-peak value of a reproduction signal from low pass circuit 41 arrives at a predetermined value. For example, when the signal is modulated by the 1-7 method and recorded, determination is made whether the ratio of the intensity of the 8T signal which is the longest signal to the intensity of the 2T signal which is the shortest signal, i.e. 2T/8T, is within the range of 0.1–0.7, preferably in the range of 0.3–0.5. Reproduction signal determination circuit 50 provides the determined result to duty correction circuit 45 to adjust the duty of a pulse signal generated from duty correction circuit 45 so that the ON time of the laser beam is increased when 2T/8T takes a value outside and smaller than the above-described range, and to reduce the ON time of the laser beam when 2 T/8 T is outside and greater than the above range. Although the duty of the pulse laser beam is adjusted according to the level of the amplitude of a reproduction signal in the example of FIG. 35, a structure may be provided so that the intensity of the laser beam is adjusted instead.

Duty correction circuit 45 determines the duty in generating a pulse signal according to the determination result from reproduction signal determination circuit 50 to generate a pulse signal from the synchronizing signal output from synchronizing signal input circuit 47 according to the determined duty. The generated pulse signal is provided to laser drive circuit 35. According to the modification of FIG. 35, the duty of a laser beam can be corrected according to the intensity of the reproduced signal by provision of reproduction signal determination circuit 50.

Figure 36:
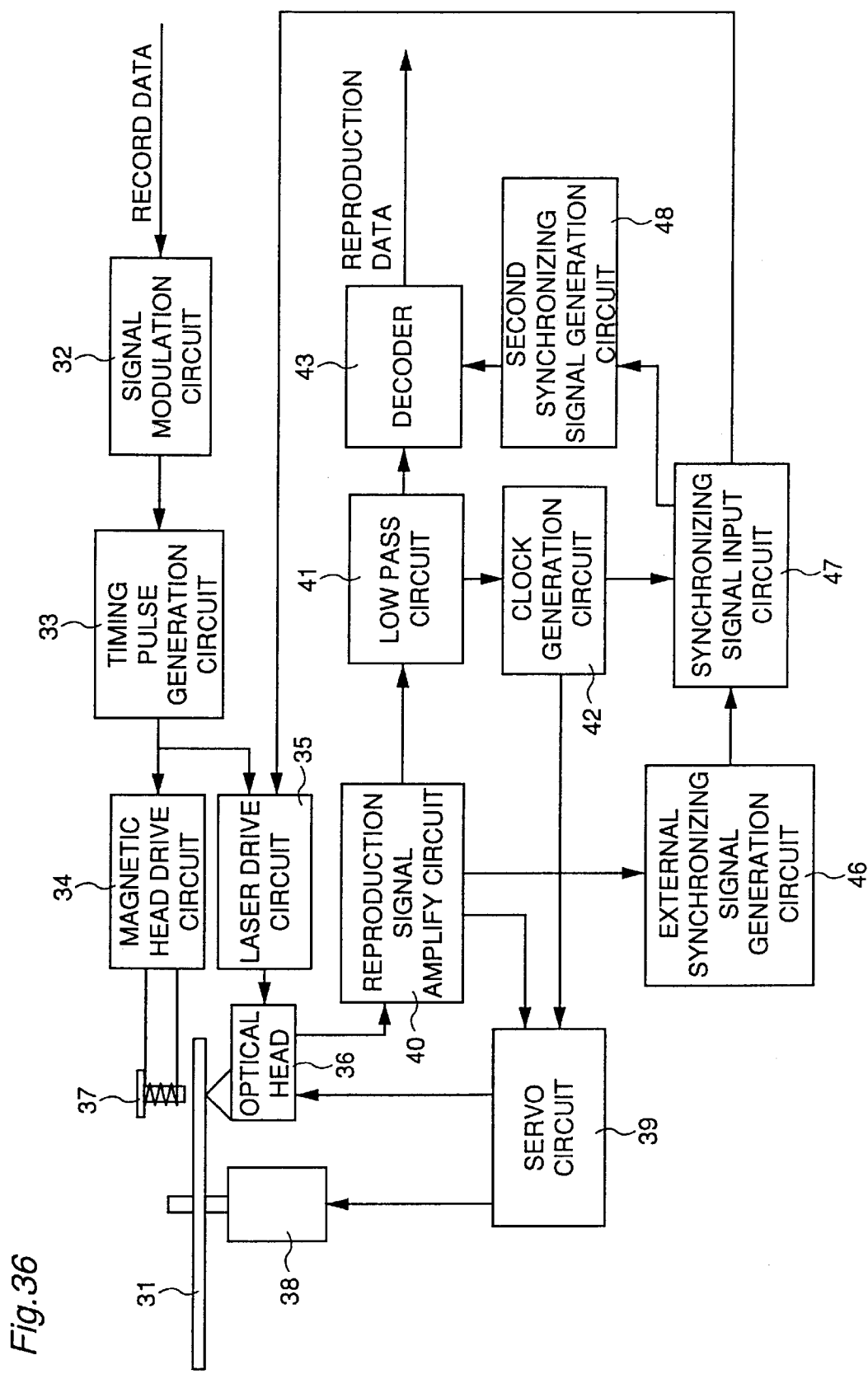

A third modification of the fourth embodiment of the present invention will be described with reference to FIG. 36. The modification of FIG. 36 is similar to the fourth embodiment shown in FIG. 27 except for the following points. Description of common elements will not be repeated.

In the third modification, a second synchronizing signal generation circuit 48 is provided for generating and supplying to decoder 43 a second synchronizing signal according to a synchronizing signal to provide a pulsed laser beam from synchronizing signal input circuit 47. The operation of second synchronizing signal generation circuit 48 will be described with reference to FIGS. 37A and 37B. FIG. 37A shows the synchronizing signal generated by synchronizing signal input circuit 47 (312 of FIG. 32C) partially enlarged in the direction of the time axis. Second synchronizing signal generation circuit 48 delays synchronizing signal 312 from synchronizing signal input circuit 47 by a predetermined time of τ to generate a second synchronizing signal (314 of FIG. 37B). This second synchronizing signal 314 is applied to decoder 43. Second synchronizing signal 314 generated by second synchronizing signal generation circuit 48 is applied to decoder 43 as a synchronizing signal for detecting a reproduction signal at the time point when the reproduction signal from the magneto-optical recording medium is maximum, similar to second synchronizing signal generation circuit 48 included in the modification of the first embodiment of FIG. 9. According to second synchronizing signal 314 from second synchronizing signal generation circuit 48, decoder 43 detects a reproduction signal from low pass circuit 41 to apply a decode process.

Since a second synchronizing signal for detecting a reproduction signal is generated according to an external synchronizing signal formed according to a wobble of the recording medium in the modification shown in FIG. 36, the second synchronizing signal can be continuously generated for determining the detection timing of a reproduction signal even when there is a missing portion in the internal clock due to a drop in a reproduction signal from the recording medium. A reproduction signal can be reliably detected irrespective of whether there is a missing portion in the internal clock. In the present modification, the value of τ is within the range of −180°~+180° corresponding to the amount of delay between first synchronizing signal and the second synchronizing signal previously described with reference to FIG. 9.

A fourth modification of the fourth embodiment of the present invention will be described with reference to FIG. 38. The modification of FIG. 38.is similar to the modification of FIG. 36 except for the following points. Description of common elements will not be repeated.

Figure 38:
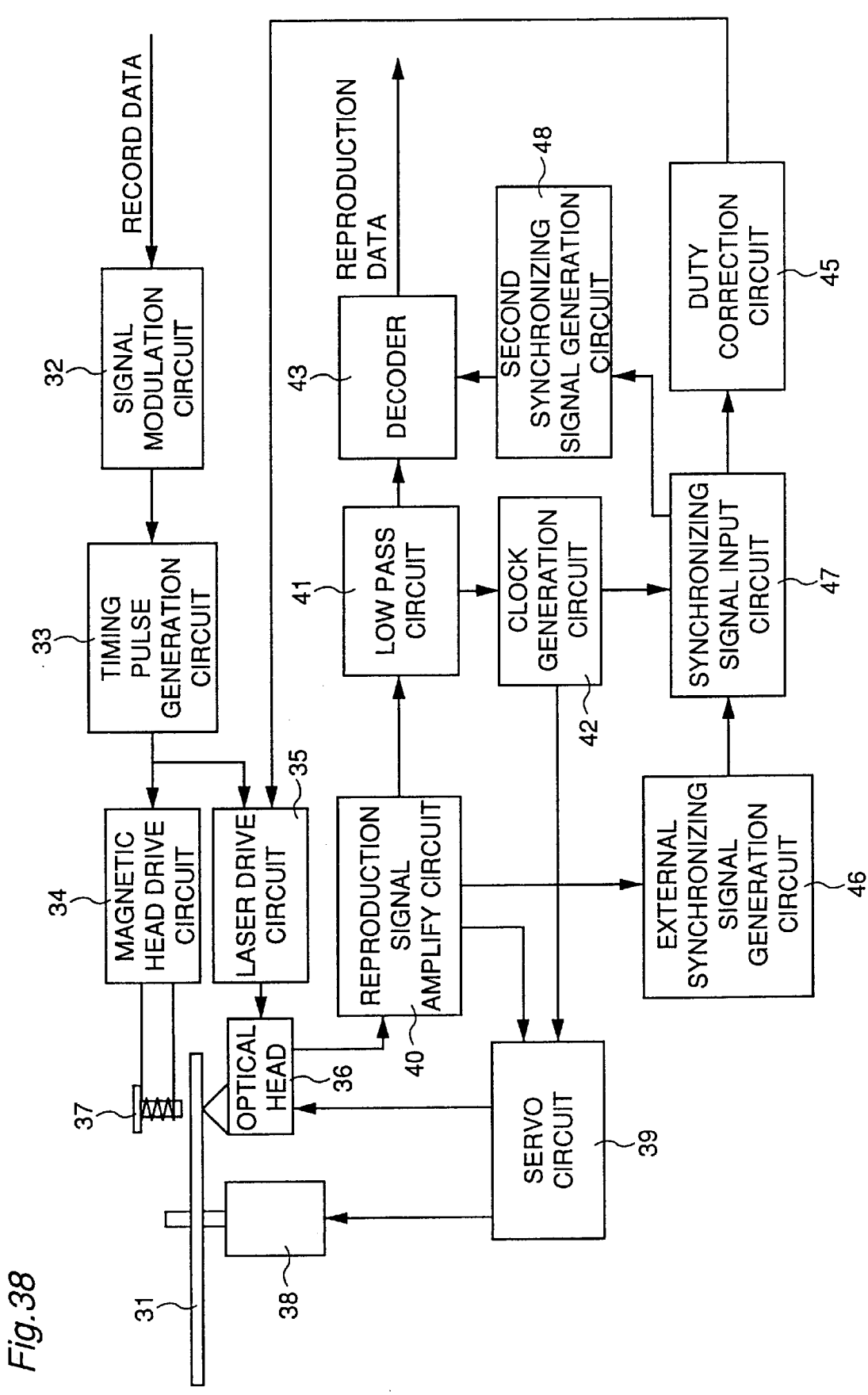
FIGS. 38, 39, and 40 are block diagrams showing a fourth modification, a fifth modification, and a sixth modification, respectively, of the fourth embodiment of FIG. 27.

In the modification of FIG. 38, a duty correction circuit 45 is provided between synchronizing signal input circuit 47 and laser drive circuit 35. The function of duty correction circuit 45 has already been described in association with the first modification shown in FIG. 35. Description thereof will not be repeated.

Figure 39:
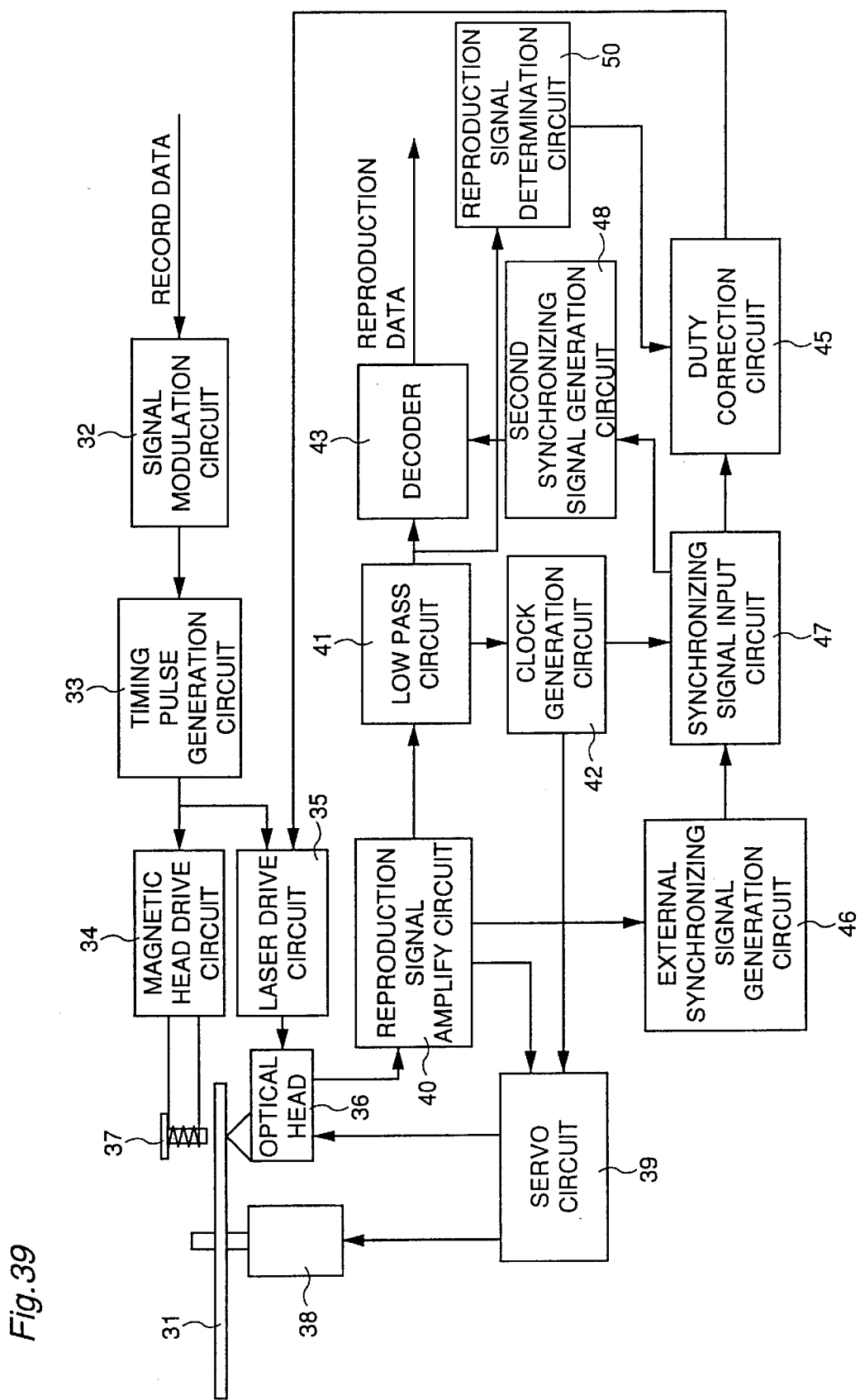

A fifth modification of the fourth embodiment of the present invention will be described with reference to FIG. 39. The modification of FIG. 39 is similar to the modification of FIG. 38 except for the following points. Description of common elements will not be repeated.

In the modification of FIG. 39, a reproduction signal determination circuit 50 is provided between low pass circuit 41 and duty correction circuit 45. More specifically, the modification of FIG. 39 is a combination of the modifications of FIGS. 38 and 35. Second synchronizing signal generation circuit 48 and reproduction signal determination circuit 50 have functions described in association with the respective modifications of FIGS. 36 and 35. Description of respective circuits will not be repeated. According to the structure shown in FIG. 39, the following advantage is obtained. In the modification of FIG. 39, the duty of the synchronizing signal for providing a pulsed laser beam can be corrected and a reproduction signal can be detected at the time point when the reproduction signal is greatest according to the intensity of the signal actually reproduced from the recording medium. Therefore, the reproduction characteristics can further be improved.

Figure 40:
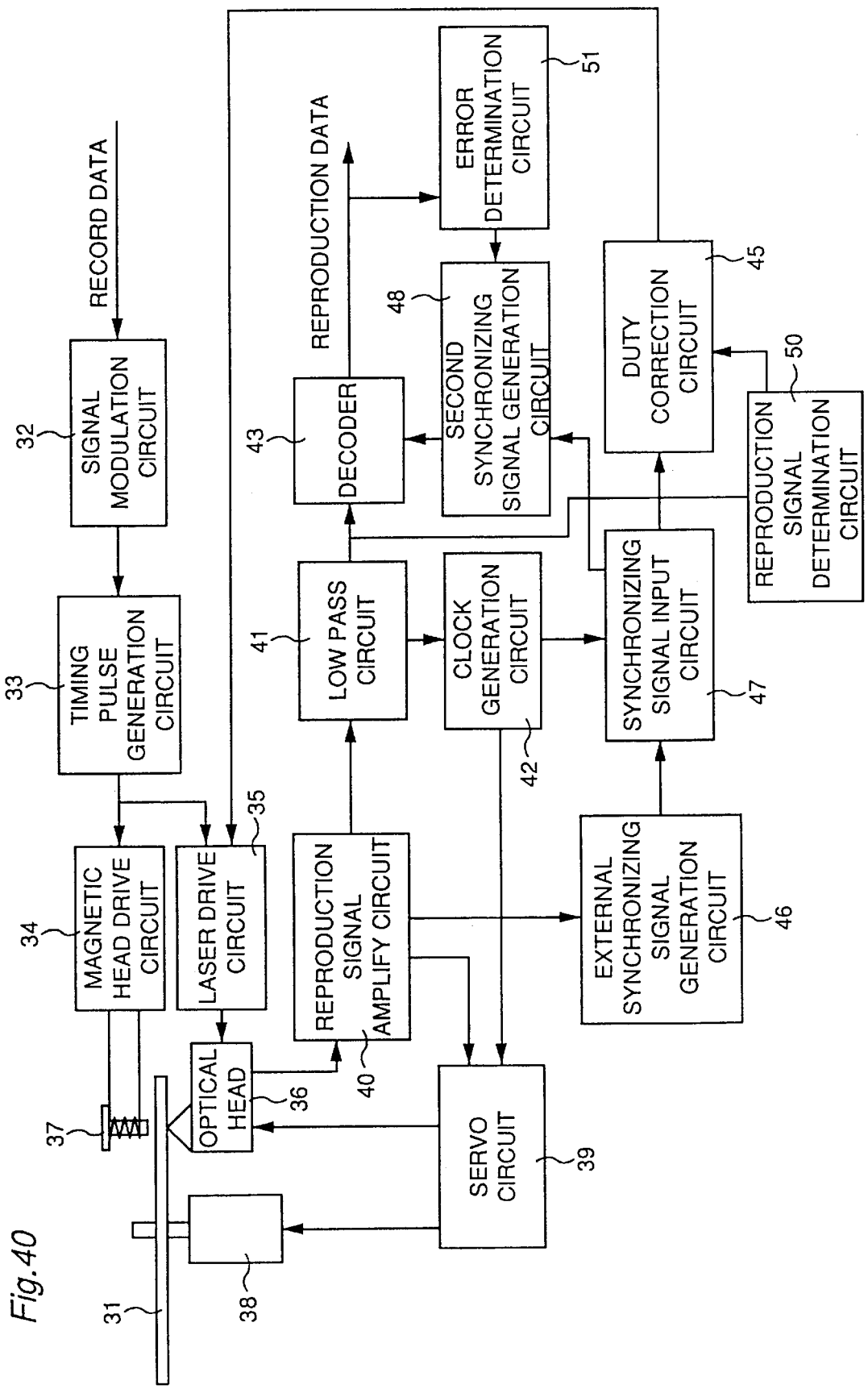

A sixth modification of the fourth embodiment of the present invention will be described with reference to FIG. 40. The modification of FIG. 40 is similar to the modification of FIG. 39 except for the following points. Description of common elements will not be repeated.

In the modification of the FIG. 40, an error determination circuit 51 is provided to receive an output of decoder 43 to carry out error determination. Error determination circuit 51 receives reproduced data that is decoded by decoder 43 to detect an error rate for determining whether a reproduction signal is detected actually at the time point when the waveform of the reproduction signal is greatest. A signal indicating the determination result is applied to second synchronizing signal generation circuit 48. Second synchronizing signal generation circuit 48 corrects the phase of the second synchronizing signal so that detection of a reproduction signal is carried out when the reproduction signal is greatest according to the determination result from error determination circuit 51. In the above-described fourth embodiment and modifications thereof shown in FIGS. 27, 34, 35, 36, 38, 39 and 40, an optical head 36 for providing a pulsed laser beam is used having the structure of the optical head in the second embodiment of FIG. 14. Therefore, an optical superresolution method can be applied on the pulsed laser beam while providing a pulsed laser beam according to a synchronizing signal at the time of reproduction.

It is to be noted that synchronizing signal input circuit 47 can be omitted in the fourth embodiment and modifications thereof shown in FIGS. 27, 34, 35, 36, 38, 39 and 40. In this case, an external synchronizing signal generated from external synchronizing signal generation circuit 46 is directly applied to laser drive circuit 35, duty correction circuit 45, or second synchronizing signal generation circuit 48. The phase correction of the external synchronizing signal according to an internal clock generated by clock generation circuit 42 is not carried out. In other words, a synchronizing signal for providing a pulsed laser beam and a second synchronizing signal for defining the time point when a reproduction signal is greatest are generated directly according to an external synchronizing signal.

In the above-described fourth embodiment and modifications thereof, an external synchronizing signal is generated according to a wobble formed at a sidewall of a groove in a magneto-optical disk. However, an external synchronizing signal may be generated according to a pit formed at the land or groove of the disk.

Figure 41A:
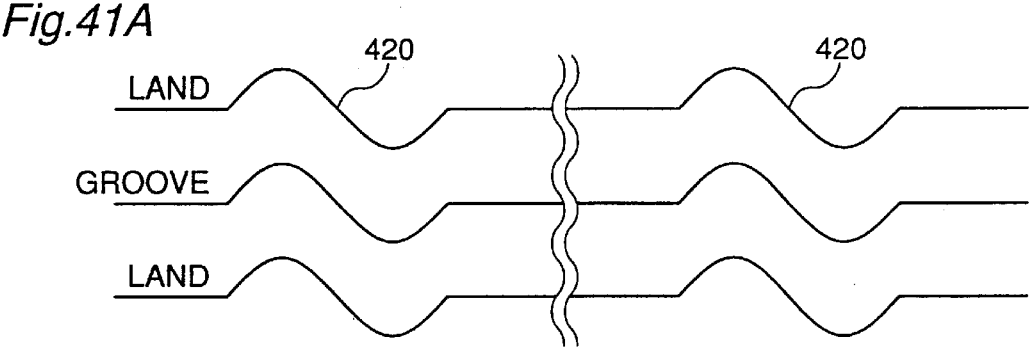
FIGS. 41A–41C are schematic diagrams showing examples of a plane configuration of a fine clock mark formed on a surface of an information recording medium.
Figure 41B:
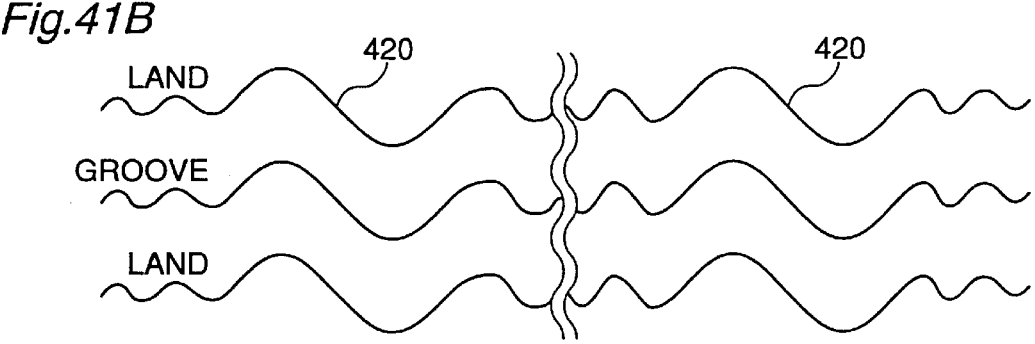
Figure 41C:
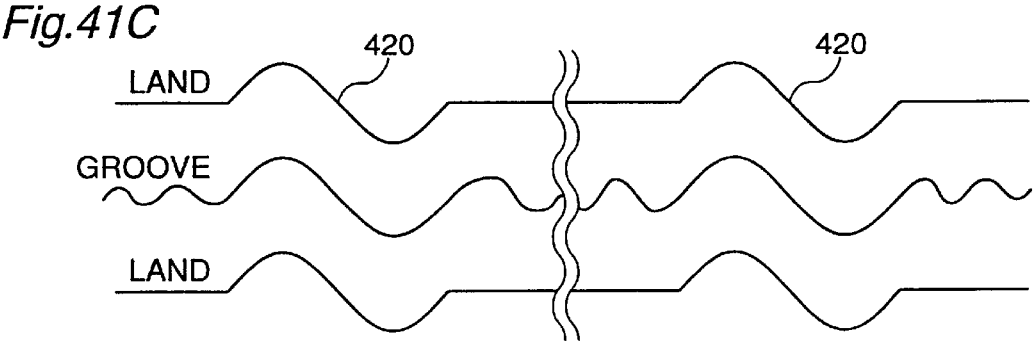

Furthermore, a structure may be provided in which an external synchronizing signal is generated according to a fine clock mark provided at a sidewall of the groove of a disk. FIGS. 41A–41C are schematic diagrams showing the plan configurations of a groove in which such a fine clock mark is provided. The fine clock mark is a reference mark of a relatively abrupt plane configuration formed at a predetermined interval along the groove to indicate the beginning of data, recording/reproduction timing of a signal, determining whether the laser beam is on the center line of the track, and the like. The fine clock mark may be formed so as to be overlay on a wobble having a relatively gentle waveform at a predetermined interval. In the examples shown in FIGS. 41A, 41B and 41C, a fine clock mark 420 is formed at both sidewalls of a groove. In the example shown in FIG. 41A, a wobble is not provided at regions other than the region where fine clock mark 420 is provided. In the example of FIG. 41B, a wobble is provided also at regions other than the region where fine clock mark 420 is formed. In the example of FIG. 41C, a wobble is formed only at one sidewall of the groove in regions other than the region where fine clock mark 420 is provided. The advantages of the above-described fourth embodiment and modifications thereof can be obtained even when a fine clock mark 420 is detected instead of wobble to be used as the reference for generating an external synchronizing signal.

According to the fourth embodiment and modifications thereof, an external synchronizing signal can be generated from a reference information signal such as a wobble, a fine clock mark, a pit, and the like provided at the surface of a medium even when there is a missing portion in reproduction signal. Thus, a pulsed laser beam for reproduction can be implemented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information recording and reproduction apparatus for an information recording medium, comprising:
    optical means for emitting a laser beam on a plane of said information recording medium in which a signal is recorded, and detecting a laser beam reflected from said signal recording plane,
    information reproduction means for reproducing information from the laser beam detected by said optical means,
    drive means for driving said optical means so as to render said emitted laser beam into a pulsed laser beam, and
    first synchronizing signal generation means for generating and providing to said drive means a first synchronizing signal for emitting said pulsed laser beam to said signal recording plane in reproduction, wherein said first synchronizing signal is generated in synchronization with a signal reproduced from said signal recording plane by said pulsed laser beam,
    wherein said optical means blocks an inner portion of said laser beam emitted from said optical means so that a laser beam formed of a main lobe and side lobes is emitted on said signal recording plane only in reproduction.

2. The information recording and reproduction apparatus according to claim 1, further comprising duty correction means for correcting duty of said first synchronizing signal.

3. The information recording and reproduction apparatus according to claim 1, further comprising second synchronizing signal generation means for delaying said first synchronizing signal for a predetermined time period to generate a second synchronizing signal, and providing said second synchronizing signal to said information reproduction means,
    wherein said information reproduction means reproduces said information in synchronization with said second synchronizing signal.

4. The information recording and reproduction apparatus according to claim 3, wherein said predetermined time period is set to a time period where said reproduction of information is carried out according to said second synchronizing signal at a timing when a waveform of a signal reproduced from said signal recording plane is maximum.

5. The information recording and reproduction apparatus according to claim 3, further comprising duty correction means for correcting duty of said first synchronizing signal.

6. The information recording and reproduction apparatus according to claim 1, wherein said optical means comprises
    a light source for generating said laser beam,
    polarization direction switching means for transmitting the generated laser beam while selectively rotating the direction of polarization of said laser beam in different directions between its outer portion and inner portion,
    polarization selecting means receiving the laser beam transmitted through said polarization direction switching means for transmitting only the laser beam that is polarized in a particular direction,
    an objective lens subject to tracking control so as to be displaced with respect to said signal recording plane for collecting the laser beam transmitted through said polarization selecting means onto said signal recording plane, and
    means for controlling said polarization direction switching means to rotate the direction of polarization of said laser beam emitted from said light source in said particular direction at said outer portion, and in a direction differing from said particular direction at said inner portion, so that an inner portion of said laser beam is blocked by said polarization selecting means to have a laser beam formed of a main lobe and side lobes enter said objective lens at the time of reproduction.

7. The information recording and reproduction apparatus according to claim 6, wherein said pulsed laser beam is emitted in reproduction by rotating the direction of polarization of the laser beam transmitted through the outer portion of said polarization direction switching means in synchronization with said first synchronizing signal.

8. The information recording and reproduction apparatus according to claim 1, wherein said optical means comprises
    a light source for generating said laser beam,
    polarization direction switching means for transmitting the generated laser beam while selectively rotating the direction of polarization of said laser beam,
    polarization selecting means receiving the laser beam transmitted through said polarization direction switching means for transmitting said laser beam at its outer portion independent of the direction of polarization and transmitting only the laser beam that is polarized in a particular direction at its inner portion, an objective lens subject to tracking control so as to be displaced with respect to said signal recording plane for collecting the laser beam transmitted through said polarization selecting means onto said signal recording plane, and means for controlling said polarization direction switching means to rotate the direction of polarization of said laser beam emitted from said light source in a direction differing from said particular direction so that an inner portion of said laser beam is blocked by said polarization selecting means to have a laser beam formed of a main lobe and side lobes enter said objective lens at the time of reproduction.

* * * * *